United States Patent
Hawk et al.

[15] 3,646,762
[45] Mar. 7, 1972

[54] SECONDARY INJECTION THRUST VECTOR CONTROL

[72] Inventors: George W. Hawk; Lewis H. Geyer, both of East Aurora, N.Y.; Alfred J. Mastropole, Allendale, N.J.; Kenneth D. Garnjost, West Falls, N.Y.

[73] Assignee: Moog, Inc., East Aurora, N.Y.

[22] Filed: Sept. 4, 1962

[21] Appl. No.: 221,079

[52] U.S. Cl. ............................ 60/204, 60/231, 239/265.23, 239/265.43, 251/31
[51] Int. Cl. ................................................. B63h 11/00
[58] Field of Search ............ 137/623, 623 P; 60/35.54, 35.55, 60/204, 231; 244/52; 102/50; 138/45; 239/265.23; 251/31

[56] References Cited

UNITED STATES PATENTS

| | | | |
|---|---|---|---|
| 2,518,625 | 8/1950 | Langstaff | 137/494 |
| 2,952,123 | 9/1960 | Rich | 60/35.54 |
| 2,998,198 | 8/1961 | Young | 239/455 |
| 3,015,210 | 1/1962 | Williamson et al. | 60/35.54 |
| 3,042,005 | 7/1962 | Gray | 137/623 X |
| 3,055,383 | 9/1962 | Paine | 137/623 X |
| 3,070,957 | 1/1963 | McCorkle | 60/35.55 |
| 2,546,673 | 3/1951 | Mattix | 138/45 |
| 2,590,215 | 3/1952 | Sausa | 139/45 |
| 3,128,602 | 4/1964 | Salenka | 60/35.54 |
| 3,134,225 | 5/1964 | Pennington | 60/35.54 |

FOREIGN PATENTS OR APPLICATIONS

| | | | |
|---|---|---|---|
| 222,794 | 0/1924 | Great Britain | 138/45 |

OTHER PUBLICATIONS

Wiegard (German Printed Publication) 1,107,514, May 25, 1961 60– 35.54 (2 shts. dwg. 3 pp. spec.)

Aerospace Engineering Publication– Secondary–Injection Thrust Vector control Systems by G. W. Hawk and L. H. Geyer, Aerospace Engineering publication; Vol. 21, No. 5, May 1962, pp. 36– 40,

*Primary Examiner*—Carlton R. Croyle
*Attorney*—Sommer & Weber

[57] ABSTRACT

This invention relates to a method and apparatus for controlling the angular deflection of the thrust vector of a fluid stream discharged from the divergent section of a supersonic nozzle. In particular, the stream discharging from the nozzle is deflected by a fluid jet which is injected at a substantially constant velocity regardless of the amount of fluid injected.

31 Claims, 13 Drawing Figures

PATENTED MAR 7 1972 3,646,762

INVENTORS
GEORGE W. HAWK
LEWIS H. GEYER
ALFRED J. MASTROPOLE
KENNETH D. GARNJOST

BY Popp and Sommer ATTORNEYS.

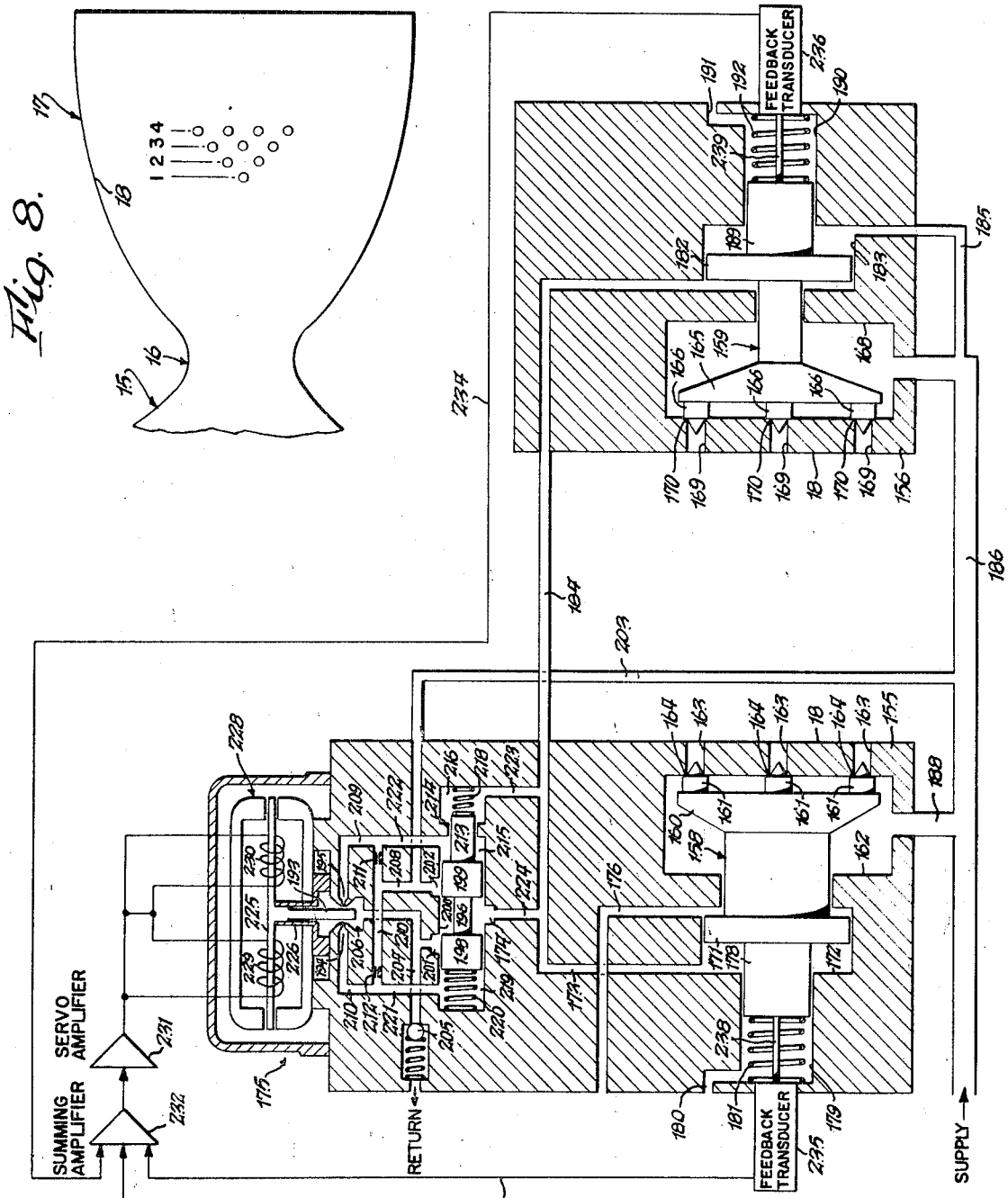

INVENTORS
GEORGE W. HAWK
LEWIS H. GEYER
ALFRED J. MASTROPOLE
KENNETH D. GARNJOST
BY Popp and Sommer ATTORNEYS.

SECONDARY INJECTION THRUST VECTOR CONTROL

Contemporary solid propellant rockets employ a movable vane known as a jetavator or movable nozzle means for the purpose of providing missile control. Although both of these methods of jet deflection have enjoyed a reasonable degree of success, they both suffer from the shortcoming that movable structure must exist submerged in or directly adjacent to the extremely hot erosive rocket blast. As newer solid propellant mixes are developed, the temperature and erosive character of the rocket exhaust products have increased to the point where it is doubtful that either jetavator or movable nozzles can provide a reliable method of thrust vector control.

It is accordingly the primary object of the present invention to provide a method and apparatus for controlling the effective rocket thrust vector by other than mechanical means subjected to the hot rocket blast discharged by the supersonic nozzle and thereby circumvent the aforementioned problems attending the use of jetavators or movable nozzles as a technique for thrust vector control.

The present invention is based on the concept of injecting a fluid into the supersonic section of the rocket nozzle so that interaction between the injectant and the main gas stream provides a shock wave which amplifies the injectant reactive force. This technique is known as secondary injection. The novel feature of this concept forming the subject of the present invention is that the fluid is injected in an amount variable according to the extent of thrust vector deflection desired, but is injected at a substantially constant velocity regardless of the amount of fluid injected. Insofar as apparatus is concerned, this is achieved by means providing a variable orifice area and means for supplying fluid under substantially constant pressure to such area.

Another object of the present invention is to provide secondary injection thrust vector control which is effective even where high angles of vector thrust control are desired.

A further object of the present invention is to provide such secondary injection thrust vector control which is efficient in the amount of fluid required to be injected.

Other objects and advantages of the present invention will be apparent from the following detailed description of several embodiments thereof shown in the accompanying drawings in which:

FIG. 7 is a third diagrammatic embodiment of the invention;

FIG. 8 is a fragmentary diagrammatic view similar to FIG. 2 and showing multipoint location for introduction of injectant into the nozzle;

Figure 1:
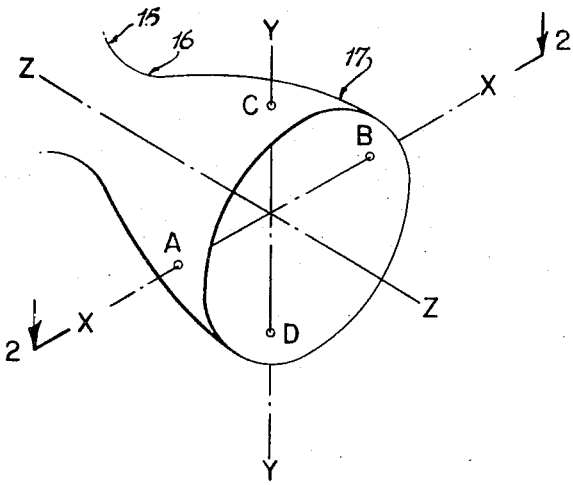
FIG. 1 is a fragmentary perspective diagrammatic view of a convergent-divergent nozzle on which is indicated the preferred locations from which fluid is injected for thrust vector control according to the principle of the present invention.
Figure 2:
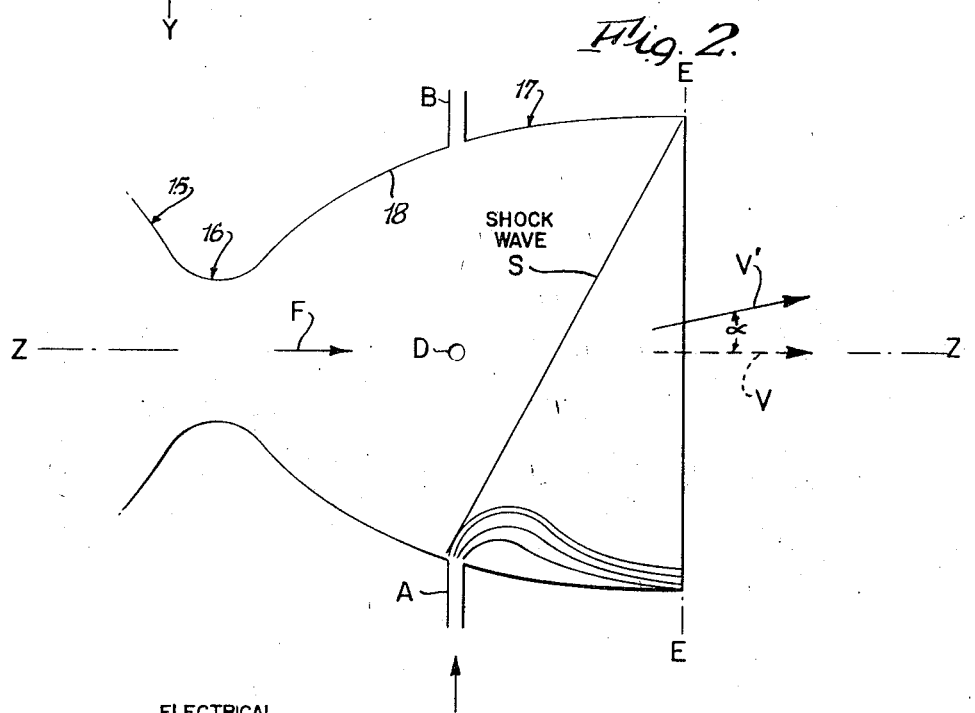
FIG. 2 is an enlarged fragmentary diagrammatic longitudinal sectional view through the nozzle shown in FIG. 1, taken on line 2—2 thereof, and illustrating the shock wave resulting from the secondary injection of fluid into the main stream being discharged from the nozzle.

Referring to FIGS. 1 and 2, the nozzle there shown is of the convergent-divergent or DeLaval type having a convergent section 15, a throat section 16 and a divergent section 17, all circular in cross section, to provide a passage 18. The flow from the throat or minimum area section 16 of this nozzle to the exit plane E—E (FIG. 2) exists in the supersonic regime when the nozzle is operating above the flow critical pressure ratio. If the flow adjacent to the nozzle wall in this supersonic regime is disturbed to an extent that the boundary layer separates, or diverges from the surface, a shock wave will be generated which will propagate outwardly from the wall. Such a shock wave is represented at S in FIG. 2. This shock wave will cause the fluid stream flowing through the nozzle to feel the effect of the initial disturbance. Because of the character of the main stream flow and the origin of the disturbance, the shock wave generated will be oblique as illustrated. As the main gas stream represented by the arrow F passes through this oblique shock wave S several changes in the flow occur including an increase in static pressure, a slight decrease in total pressure and alteration of the flow trajectory from the direction of flow represented by the vector V to the direction represented by the vector V', the angle between the vectors V and V' being $\alpha$. The net result of these effects is that a side force is generated which is equivalent to the static pressure rise across the shock wave integrated over the "shadow area" behind the shock. This force is also proportional to the angular deflection $\alpha$ of the main rocket gas flow as it passes through the oblique shock.

Pictorially, the shock wave shown in FIG. 2 is generated by the injection into the nozzle section 17 of a fluid, the direction of injection being generally transverse of the main fluid stream F flowing through the nozzle.

Referring to FIG. 1, the nozzle is shown as having a transverse horizontal axis X—X, a transverse vertical axis Y—Y and a central longitudinal axis Z—Z. In order for the thrust vector V to be angularly deflectable on opposite sides of the longitudinal axis Z—Z in the X-Z plane, two locations A and B are provided on diametrically opposite sides of the nozzle section 17 in substantially the same transverse plane. In order to be able to cause the vector V to move or have a component movable on opposite sides of the longitudinal axis Z—Z in the Y-Z plane, two locations C and D are provided on diametrically opposite sides of the nozzle section 17 in substantially the same transverse plane. As shown, the various injection locations A, B, C and D lie in the same plane extending transversely of the nozzle but the nozzles A and B lie in the longitudinal plane X-Z which is perpendicular to the longitudinal plane Y-Z.

From the foregoing, it will be seen that by alternatively injecting fluid from the corresponding pair of injection locations A and B, the vector V or a component thereof may be caused to deflect in a plane at right angles to deflection of the vector or a component thereof controlled in a second plane by alternatively injecting fluid from a second pair of injection locations C and D. In this manner, the effective thrust vector of the fluid stream being discharged from the nozzle can be angularly deflected to pass through any location in the exit plane E—E having coordinates related to the perpendicular transverse axes X—X and Y—Y.

The outstanding feature of the present invention is that the injectant fluid regardless of amount is injected at a substantially constant velocity. The amount of injectant fluid is varied according to the extent of thrust vector deflection desired. From a constructional point of view, this is achieved by providing an orifice of variable area and supplying such area with injectant fluid under substantially constant pressure.

Figure 4:
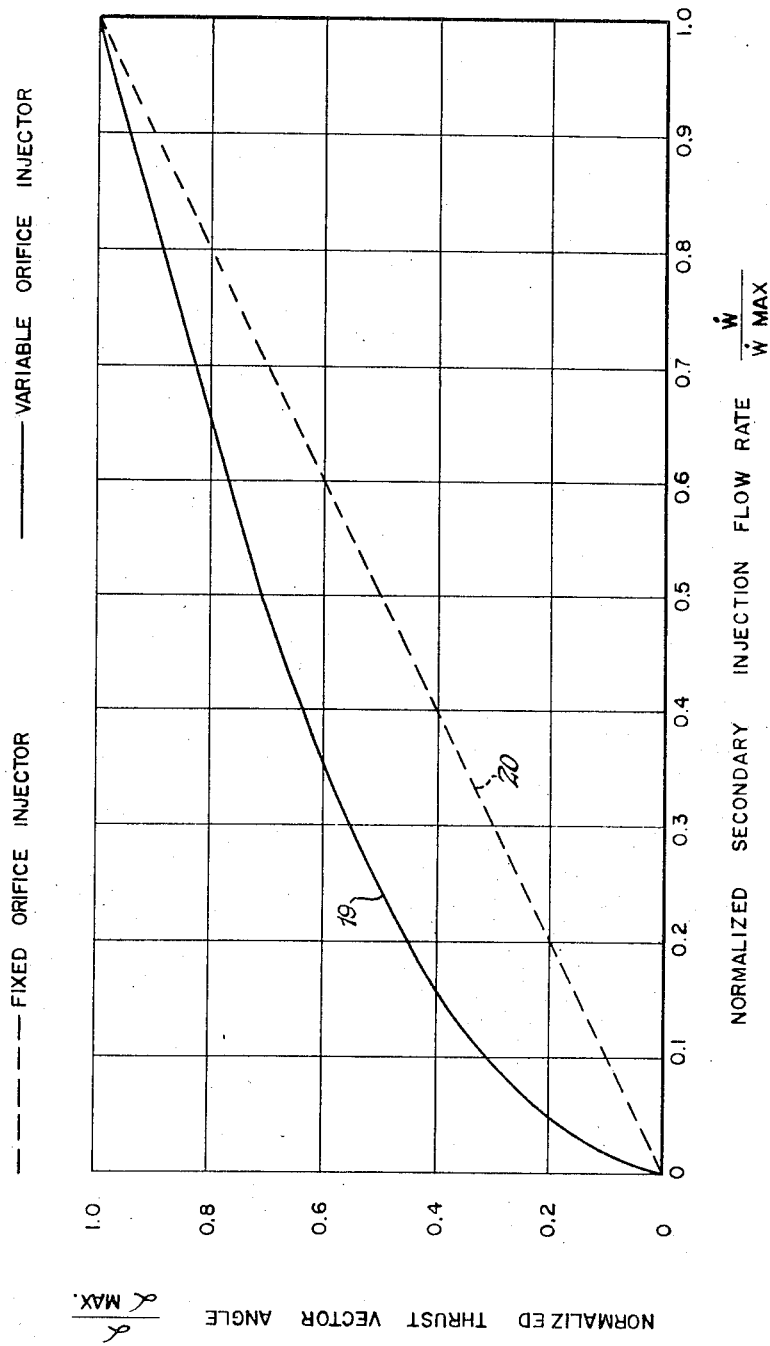
FIG. 4 is a graph showing the comparison of the flow rates of injectant required when injected by an injector having an orifice of variable area as compared to fixed area.

The relationship of the flow rate of injectant required for a fixed as compared to a variable orifice area is graphically illustrated in FIG. 4 wherein normalized secondary injection flow rate is plotted against normalized thrust vector angle. The solid curve line 19 represents the variable orifice area and the broken curve line 20 represents the characteristics of the fixed orifice area. Examining this plot, it will be seen that the effectiveness of secondary injection is related to the rate of change or momentum of the injected fluid. Hence, with a constant pressure supply to a variable area injector, the velocity of the injected fluid will be nearly constant throughout the entire control range so that at small orifice openings the velocity and hence the momentum rate will remain high. In contrast, with a fixed injection orifice for small deflections of the thrust vector the velocity of the injected fluid will be low. Hence, the rate of change of momentum is low and the effectiveness of this fixed area orifice injector is poor. With a variable area orifice injector, especially in the low range of thrust vector angular deflection control, the high velocity of the injected fluid is maintained in turn to maintain the high rate of momentum thereby providing good effectiveness. Accordingly, a lesser amount of fluid needs to be injected according to the variable orifice concept of the present invention than needs to be injected according to the fixed orifice area concept in order to achieve the same amount of thrust vector control at low angles of thrust vector deflection.

Figure 3:
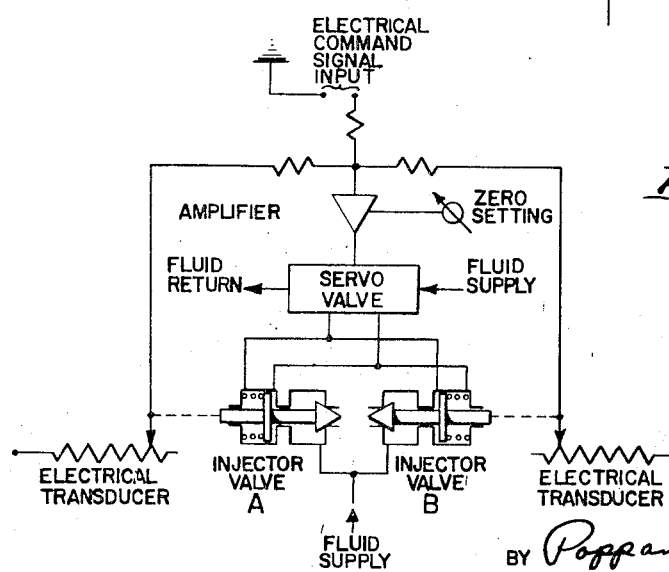
FIG. 3 is a schematic view of a secondary injection thrust vector control system constructed according to the principles of the present invention.

The general system or apparatus embodying the concept of the present invention is schematically illustrated in FIG. 3 wherein injector valve A and injector valve B are intended to be arranged at diametrically opposite locations on the wall of the nozzle section 17. Each valve engages a seat surrounding an outlet for a chamber which is supplied with fluid under pressure and whose pressure remains substantially constant regardless of the position of the valve relative to its seat. Each injector valve is further shown as being movable toward and away from its seat by fluid operated means under control of a servovalve, preferably of the electrohydraulic type which is supplied with pressurized fluid from either the injectant reservoir or a separate hydraulic power supply and which is supplied with an electrical command signal input through an amplifier having a zero setting and which amplifies the sum of electrical command signal input and the respective electrical feedbacks from electrical transducers severally associated with the injector valves. As shown in FIG. 3, each of the injector valves A and B is biased toward a closed position by mechanical spring means.

FIG. 5

Figure 5:
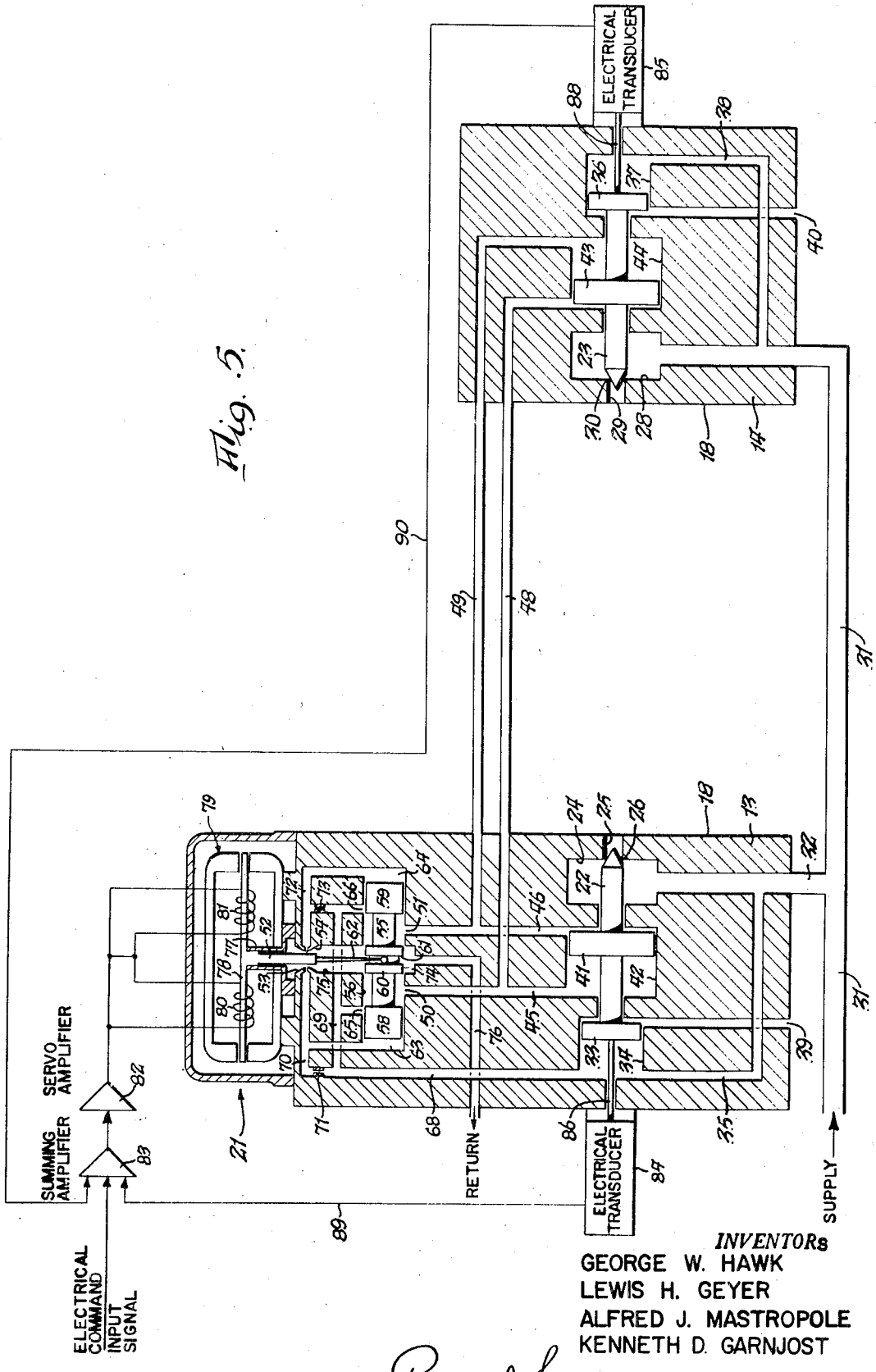
FIG. 5 is a diagrammatic view of a secondary injection thrust vector control system constituting one embodiment of the present invention.

One operative embodiment of the present invention is diagrammatically illustrated in FIG. 5. This embodiment shown an electrohydraulic mechanical feedback flow control servovalve indicated generally at 21, operatively arranged on a servosystem having electrical feedback as hereinafter described, and operatively associated with injector valves 22 and 23 which are severally biased toward a closed position by fluid means as opposed to the mechanical means illustrated in FIG. 3.

More specifically, the numerals 13 and 14 represent body portions of the divergent wall section 17 of a supersonic nozzle on diagrammatically opposite sides of the passage 18 formed thereby. The injector valve 22 is shown as slidably arranged in a chamber 24 having an outlet 25 surrounded at its inner end by a seat 26 adapted to be engaged by the tip or head of the valve 22. Similarly the other injector valve 23 is shown as being slidably arranged in a chamber 28 having an outlet 29, the inner end of which is surrounded by a seat 30 adapted to be engaged by the tip or head of the valve 23.

The chambers 24 and 28 are supplied with fluid under a substantially constant pressure produced by any suitable source such as a pump (not shown) through a main supply line 31 shown as leading directly to the chamber 28 and from which a branch line 32 extends to the chamber 24.

Each of the valves 22 and 23 is shown as being biased or urged toward its respective seat 26 or 30. For this purpose, the rear end of the valve 22 carries a piston head 33 working in a cylinder 34 provided in the body 13 and supplied with fluid from the branch line 32 via a second branch line 35. Similarly the other valve 23 at its rear end carries a piston head 36 slidably arranged in a cylinder 37 provided in the body 14 communicating via the branch line 38 with the main supply line 31, the branch line also being provided in the body 14. The portion of the cylinder 24 on the forward side of the piston 33 is vented via the passage 39. The corresponding vent passage for the cylinder 37 is shown at 40.

Fluid operated means are provided for moving each of the valves 22 and 23 toward and away from their respective seats 26 and 30. In the case of the valve 22, it is provided intermediate its ends with an enlarged piston head 41 which is slidably arranged in a cylinder 42 provided in the body 13. The other valve 23 intermediate its ends is provided with a piston head 43 slidably arranged in a cylinder 44 provided in the body 14. The chamber 42 on opposite sides of the piston 41 is serviced with fluid through the lines 45 and 46, the line 45 leading to the rear or left of the piston 41 and the line 46 leading to the front or right side thereof. The chamber 44 on the left or front side of the piston 43 is serviced with fluid by a branch line 48 which communicates with the line 45. The chamber 44 on the rear or right side of the piston 43 is serviced with fluid by a branch line 49 communicating with the line 46.

The lines 45 and 46 communicate with the actuating ports 50 and 51, respectively, of the electrohydraulic servovalve 21 now to be described. Such servovalve is shown as being of the mechanical feedback, flow control type. It comprises a first stage hydraulic amplifier including a flapper 52 movably arranged between a pair of nozzles 53 and 54, and a second stage spool 55 slidably arranged within a chamber 56 provided in the body 13. The spool 55 has end lobes 58 and 59 and an intermediate lobe 60 provided with a socket 61. A feedback spring wire 62 is fixedly connected at its upper end to the flapper 52 and its lower end is spherically enlarged and rollingly arranged in the socket 61 so as to be constrained to move with the spool 55. The end portion of the chamber 56 outwardly of the left end lobe 58 provides a spool end chamber 63. A similar spool end chamber 64 is provided outwardly of the right end lobe 59. The lobe 58 is operatively associated with a pressure port 65 and the lobe 59 with a similar pressure port 66. The ports 65 and 66 are supplied with fluid under supply pressure via the lines 68 and 69. The nozzle 53 is supplied with fluid via the line 70 communicating with the line 68 and having the restrictor 71 therein. The other nozzle 54 communicates with the branch line 69 via the line 72 having the restrictor 73 therein. The spool end chamber 63 communicates with line 70 between restrictor 71 and nozzle 53. The other spool end chamber 64 communicates with line 72 between restrictor 73 and nozzle 54.

The center lobe 60 of the valve spool 55 is operatively associated with a return port 74 communicating with a sump chamber 75 into which the nozzles 53 and 54 discharge fluid. A drain or return line 76 connects the port 74 with any suitable reservoir (not shown) for collecting drain fluid.

The actuating port 50 communicates with chamber 56 between valve spool lobes 58 and 60. The other actuating port 51 communicates with chamber 56 between valve spool lobes 59 and 61.

The flapper 52 is shown as depending from a horizontally disposed movable armature 78 the ends of which are arranged between the spaced pole pieces of a polarized electrical force or torque motor indicated generally at 79 and having coils 80 and 81 surrounding the armature 78. These coils 80 and 81 are operatively associated with an amplifier 82 which is adapted to feed an electrical signal into the coils 80 and 81 in a manner well known to and understood by those well skilled in the art. The armature-flapper member 78, 52 is supported for pivotal movement on a flexure tube 77 which also acts to isolate the motor section from the hydraulic section.

The mechanical feedback flow control servovalve 21 illustrated is of the type shown in U.S. Pat. No. 2,023,782 to which reference is made for a more detailed explanation of construction and operation of such servovalve.

The servosystem shown in FIG. 5 illustrates electrical feedback from each of the injector valves 22 and 23 to a summing amplifier 83 which also receives the electrical command signal input. For this purpose, an electrical transducer 84 is operatively associated with the valve 22 and a similar electrical transducer 85 is operatively associated with the other valve 23. These electrical transducers 84 and 85 may be of any suitable type such as a linear variable differential transformer, the slug or movable element of which is connected to the valve by a stem such as shown at 86 in the case of the valve 22 and at 88 in the case of the valve 23. The electrical output of the transducer 84 is fed to the summing amplifier 83 via a conductor 89 and that of the other transducer 85 via a conductor 90.

With no electrical command signal input impressed upon the electrohydraulic servovalve 21, it will be seen that the supply pressure acting upon the pistons 33 and 36 will maintain the valves 22 and 23 against their respective seats in a closed condition.

Assume now that an electrical command signal input is fed into the summing amplifier 83. This is amplified and the coils 80 and 81 are suitably energized. The T-shaped armature-flapper member 78, 52 pivots, the flexure tube 77 permitting this to occur. Let us assume that the armature-flapper member pivots in a counterclockwise direction as viewed in FIG. 5 so that the flapper 52 moves closer to the nozzle 54 and correspondingly farther away from the nozzle 53. A pressure differential is thereby developed in the spool end chambers 63 and 64, with the predominant pressure in the right spool end chamber 64. This will drive the valve spool 55 to the left thereby connecting the pressure port 65 with the actuating port 50 and the return port 74 with the actuating port 51. As a result, the left actuating line 45 is connected to supply pressure and the right actuating line 46 is connected to drain. This operates to urge the piston 41 from left to right or to maintain the valve 22 firmly against its seat 26 and thereby keep this valve closed. On the other hand, supply pressure is now acting upon the left hand end face of the piston 43 whereas the right hand end face is connected to drain. This pressure differential across the piston 43 moves the valve 23 from left to right or away from its seat 30 so as to open this valve.

Inasmuch as fluid under substantially constant pressure is being supplied to the chamber 28 by the line 31, such fluid is discharged through the orifice formed between the seat 30 and the tip or head of the partially unseated valve 23. As the valve 23 moves from left to right, the electrical transducer 85 is energized causing an electrical signal to be fed back through the conductor 90 to the summing amplifier 83. This feedback signal tends to reduce the error or net electrical signal fed into the torque motor 79 and when the feedback signal is of the same magnitude as the command signal no error signal is fed by the amplifier 82 into the coils 80 and 81 of the torque motor and the valve spool 55 returns to a centered or null position. This will leave the injector valve 23 open an amount proportionate to the electrical command signal input because a feature of the servovalve 21 shown is that the displacement of the spool 55 is proportionate to the electrical signal input to the coils 80 and 81. The valve spool 55 will displace until the feedback spring wire 62 has been bent sufficiently to produce a torque upon the flapper 52 counterbalancing the torque electrically induced upon the armature 78 through energization of the motor coils 80 and 81. Injectant fluid will continue to be injected by injector valve 23 until the electrical command input signal changes.

If it is now assumed that the error signal fed into the motor coils 80 and 81 is of the opposite sign to that just considered so that the armature-flapper member will tend to move in a clockwise direction as viewed in FIG. 5, the valve spool 55 will move from left to right and thereby connect the actuating port 51 to pressure port 66 and actuating port 50 to drain port 74. Ultimately the valve spool 55 will return to null position leaving the valve 22 proportionately opened and the valve 23 closed.

In either case, the moved valve 22 or 23 will be opened an amount proportionate to the electrical command signal input. The movement of the valve away from its seat thus provides a variable orifice having an area proportionate to the electrical command signal input. In this manner, the amount of injectant fluid can be precisely controlled. Since the chambers 24 and 28 are supplied with fluid under substantially constant pressure, when either of the valves 22 or 23 opens to provide an orifice area, the velocity of the fluid through such area and injected into the passage 18 flows at a substantially constant velocity, as is desired.

FIG. 6

Figure 6:
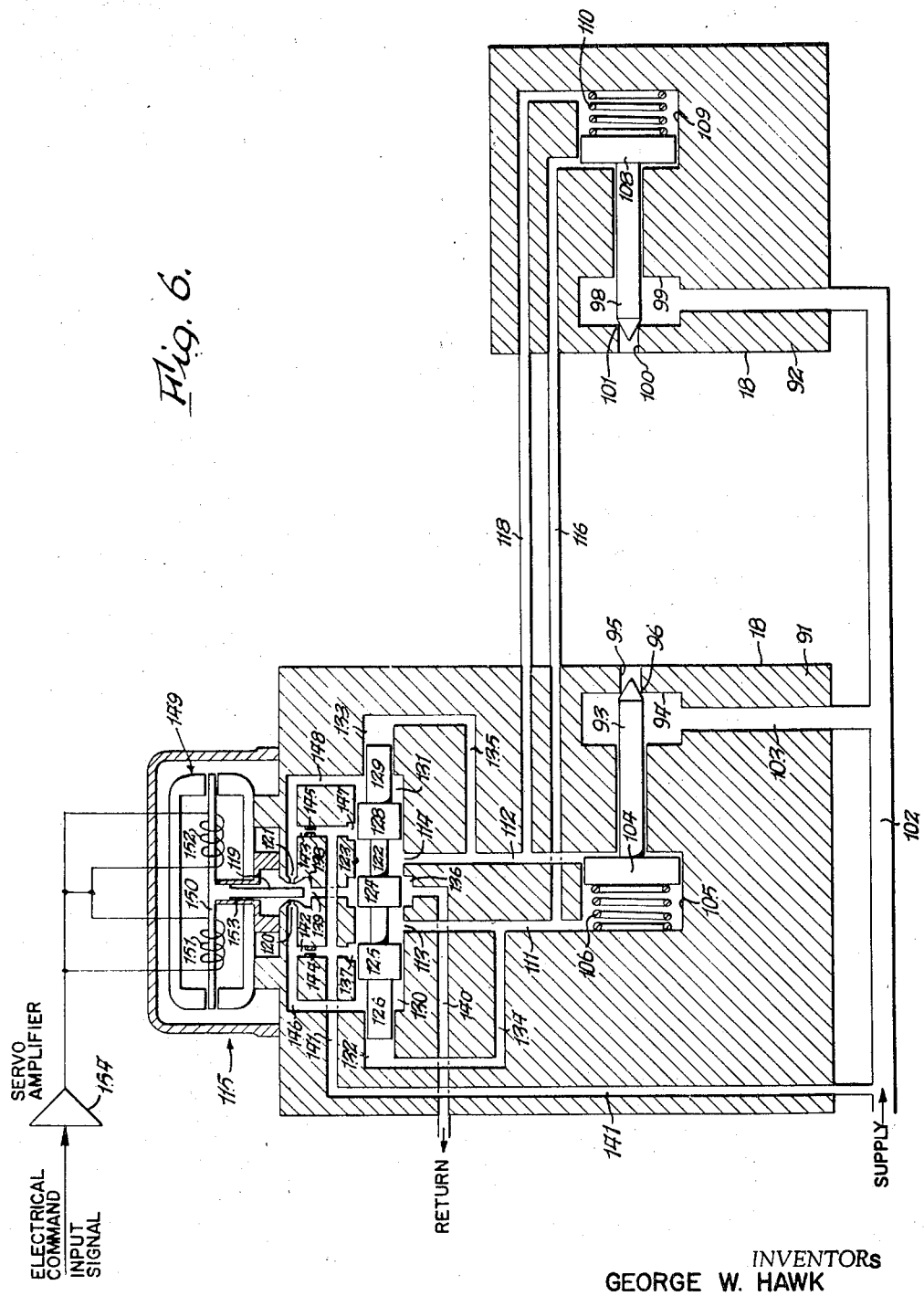
FIG. 6 is a second diagrammatic embodiment of the present invention.

The embodiment of the invention shown in FIG. 6 illustrates an electrohydraulic pressure control servovalve operatively associated with injector valves which, instead of being fluid biased toward a closed position, are mechanically biased. Because the servovalve is of the pressure control type, no feedback is necessary between the injector valves and the servovalve, the servovalve itself inherently providing pressure feedback to the valve spool.

Referring to FIG. 6, the bodies 91 and 92 may be considered as diametrically opposite portions of the wall of the divergent section 17 of the nozzle and providing therebetween the passage 18. A first injector valve 93 is shown as slidably arranged in a chamber 94 having an outlet 95 surrounded by a valve seat 96. A second injector valve 98 is slidably arranged in a chamber 99 having an outlet 100 surrounded by a valve seat 101. The chambers 94 and 99 are supplied at all times by fluid under substantially constant pressure by a main supply line 102 leading directly to the chamber 99 and a branch line 103 leading from the main line 102 to the chamber 94. The valve 93 carries a piston 104 slidably arranged in a cylinder 105 provided in the body 91. A biasing spring 106 is arranged between the outer or left-hand end wall of the cylinder 105 and the outer or left-hand end face of the piston 104. Similarly the other valve 98 carries a piston head 108 slidably arranged in a cylinder 109 provided in the body 92. A biasing spring 110 is shown as arranged between the outer or right-hand end face of the piston 108 and the outer or right-hand end face of the cylinder 109.

The portions of the cylinder 105 on opposite sides of the piston 104 are shown as being connected via lines 111 and 112 with actuating ports 113 and 114, respectively, of an electrohydraulic pressure control servovalve indicated generally at 115. The actuating port 113 is shown as connected to the portion of the cylinder 105 to the left of the piston 104 and the other actuating port 114 is connected to the portion of the cylinder 105 to the right of the piston 104. A branch line 116 places the line 112 in communication with the portion of the cylinder 109 to the left of the piston 108. A branch line 118 connects the line 112 with the portion of the cylinder 109 to the right of the piston 108.

In this manner, it will be seen that if a pressure differential exists in the lines 111 and 112 with the predominant pressure in the line 111, the valve 93 will be urged to maintain its closed position and the valve 98 will be urged toward an open position. On the other hand, if the dominant pressure is in the line 112, the valve 98 will be maintained in a closed position whereas the valve 93 will be urged to open.

The pressure control servovalve 115 comprises a first stage hydraulic amplifier including a flapper 119 movably arranged between a pair of nozzles 120 and 121, and a second stage valve spool 122. This valve spool is slidably arranged in a cylindrical chamber 123 provided in the body 91 and is shown as having a center lobe 124, a left lobe 125, a left stub end 126, a right lobe 128, and a right stub end 129. The lobes 124, 125 and 128 are slidably arranged within the cylinder 123 the end portions of which are reduced to slidably receive the stub ends 126 and 129. The outer end face of the left lobe 125 defines one wall of a drive chamber 130. A similar drive chamber 131 is provided at the other end of the spool and is partially defined by the outer end face of the right lobe 128. The outer end face of the left end stub 126 defines one wall of a feedback chamber 132. A similar feedback chamber 133 is provided at the outer end of the right end stub 129. The left feedback chamber 132 communicates via the line 134 with the right actuating line 112. The right feedback chamber 133 communicates via the line 135 with the left actuating line 111.

The center lobe 124 of the valve spool is operatively associated with a drain port 136 communicating with a sump chamber 138 via the line 139. The drain port 136 is connected to a fluid reservoir (not shown) via a drain or return line 140.

The nozzles 120 and 121 are supplied with fluid under pressure introduced from the main supply line 102 via a branch line 141 from which second branch lines 142 and 143 lead to the nozzles 120 and 121, respectively. The branch line 142 has a restrictor 144 therein and the branch line 143 has a similar restrictor 145 therein. The branch line 142 on the downstream side of the restrictor 144 communicates with the drive chamber 130 via the line 146. The other drive chamber 131 communicates with the branch line 143 on the downstream side of the restrictor 145 via the line 148. Spool end lobes 125 and 128 are operatively associated with pressure ports 137 and 147, respectively, severally communicating with pressure supply branch line 141.

The electrohydraulic servovalve 115 also includes a polarized electrical force or torque motor indicated generally at 149 having an armature 150 which is rigidly connected to the flapper 119. The ends of this armature are movably arranged between the spaced pole pieces of the motor and are operatively associated with electrical coils 151 and 152. These coils in turn are operatively associated with an amplifier 154 to which an electrical command signal input can be fed. A flexure tube 153 isolates the motor section from the hydraulic section of the servovalve and pivotally supports the armature-flapper member 150, 119.

When no electrical command signal input is being fed to the servovalve 115, it will be seen that the biasing springs 106 and 110 will remain their respective valves 93 and 98 in a closed condition by urging them against their respective seats 96 and 101.

Let us assume now that an electrical command signal input is fed into the amplifier 154 and of such sign as to electromagnetically induce the armature 150 to pivot in a counterclockwise direction. Such motion moves the flapper 119 closer to the right nozzle 121 and correspondingly farther away from the left nozzle 120. This produces a pressure differential in the nozzle chambers and hence in the drive chambers 130 and 131 with the predominant pressure in the right chamber 131. As a consequence, the valve spool 122 moves from right to left. In so doing, the left lobe 125 uncovers the pressure port 137 which is thereby placed in communication with the left actuating port 113. At the same time, the center lobe 124 uncovers the return port 136 which is thereby placed in communication with the right actuating port 114. In this manner a pressure differential is produced in the actuating lines 111 and 112 with the predominant pressure in the line 111. This predominant pressure serves to maintain the injector valve 93 in a closed condition while opening the injector valve 98 against the urging of its return spring 110. The valve 98 will move away from its seat 101 until a force balance is achieved between the pressure differential acting on the piston 108 and the return spring 110. Then the valve 98 comes to rest, having provided an orifice of predetermined area to which injectant fluid is supplied under substantially constant pressure.

No feedback of injector valve motion is necessary with the pressure control servovalve 115 shown in FIG. 6 because the operating characteristic of this valve is that the pressure differential developed in the output lines 111 and 112 for the servovalve is fed back to the valve spool 122 via the lines 134 and 135. In other words, such a pressure control valve will develop a pressure differential proportionate to the electrical command signal input, and this pressure differential determines the extent to which either injector valve 93 or 98 opens or unseats.

A fuller disclosure of the construction and operation of such a pressure control servovalve 115 is disclosed in U.S. Pat. No. 2,931,389.

Assume now that the sign of the electrical command signal input is reversed so that the armature-flapper member 150, 119 is urged to pivot in a clockwise direction as viewed in FIG. 6. This will produce a higher pressure in the left nozzle chamber 120 than in the right nozzle chamber 121, thereby driving the valve spool 122 from left to right. This will uncover the pressure port 147 and place the same in communication with the right actuating port 114, and will also uncover the return port 136 and place the same in communication with the left actuating port 113. Now the pressure differential in the actuating lines 111 and 112 is such that the predominant pressure is in the line 112. This will cause the injector valve 98 to remain closed but wild urge the other injector valve 93 to open until the forces acting on its piston 104 balance out whereupon the valve 93 comes to rest in a predetermined opened position.

With the form of the invention shown in FIG. 6, it will be seen that a variable orifice area to which fluid is supplied under substantially constant pressure will be produced which is proportionate to the strength of an electrical command signal input. The sign of such signal will determine whether either the injector valve 93 or the injector valve 98 will open to produce such orifice area.

FIG. 7

The embodiment of the present invention shown in FIG. 7 comprises an electrohydraulic three-way pressure flow servovalve operatively associated with injector valves mechanically biased toward a closed position and with the servovalve arranged in a servo system having electrical feedback between the injector valves and the servovalve.

Referring to FIG. 7, the numerals 155 and 156 represent body portions diametrically opposed of the divergent nozzle section 17 to provide therebetween the passage 18.

One of the novel features of the embodiment shown in FIG. 7 is that each of the injector valves 158 and 159 has a plurality of closures severally associated with a plurality of outlets. Thus, the valve member 158 is shown as having at its inner or right end an enlarged head 160 from one side of which projects a plurality of spaced pintles or closure elements 161. While three such closure elements have been shown, any number desired may be employed. The valve 158 is slidably arranged in a chamber 162 having three outlets 163 severally associated with the closure elements 161. Each of these outlets 163 is surrounded by an annular seat 164 adapted to be engaged by the corresponding valve closure element 161.

The other injector valve 159 is shown as having at its inner or left end an enlarged heat 165 from one side of which a plurality of pintles or closure elements 166 project outwardly, three such closure elements being illustrated. The valve 159 is slidably arranged in a chamber 168 having three outlets 169 severally associated with the valve closure elements 166 and each surrounded by an annular valve seat 170 adapted to be engaged by the corresponding valve closure element 166.

It will be noted that the diameter of the stem of the valve member 158 is considerably larger than that for the other valve member 159. This is for a purpose hereinafter explained.

The outer or left end of the relatively thick stem of the valve 158 is provided with an enlarged piston head 171 slidably arranged in a cylinder 172 formed in the body 155. The outer or left end portion of this cylinder 172 is shown as connected via a line 173 to an actuating port 174 of the three-way pressure flow servovalve indicated generally at 175. The inner or right end portion of the cylinder 172 is constantly vented as shown by the vent line 176. The valve 158 also includes a coaxial outwardly extending stub 178 which is smaller in diameter as compared to the portion of the valve between the enlarged heads 160 and 171. The stub 178 is slidably arranged in a chamber 179 formed in the body 155. The outer or left end portion of this chamber is constantly vented as shown by the vent line 180. A biasing spring 181 is shown as arranged in the chamber 179 between the outer end wall thereof and the outer end face of the valve stub 178. This spring 181 constantly urges the injector valve member 158 toward the right or toward a closed position.

The relatively narrow stem portion of the other injector valve 159 is shown as having an enlarged piston head 182 slidably arranged in a cylinder 183 formed in the body 156. The inner end portion of this cylinder to the left of the piston head 182 is shown as communicating with the line 173 via a branch line 184. The outer end portion of the cylinder 183 to the right of the piston head 182 is shown as communicating via a branch line 185 with the main pressure supply line 186 which leads from a suitable source (not shown) to the chamber 168. A branch line 188 places the chamber 162 in communication with the main supply line 186.

The injector valve member 159 is shown as having an outer stub 189 projecting coaxially outwardly from the right side of the piston 182. The stub 189 is shown as having a diameter larger than that for the stem portion intermediate the enlarged heads 182 and 165. The stub 189 is slidably arranged in a chamber 190 formed in the body 156. The outer or right end portion of this chamber is constantly vented via the vent line 191. A biasing spring 192 is shown as arranged in the chamber 190 between the outer end wall thereof and the outer end face of the stub 189. This spring 192 constantly urges the valve 159 to the left or to a closed position.

The servovalve 175 comprises a first stage hydraulic amplifier including a flapper 193 movably arranged between a pair of nozzles 194 and 195, and a second stage valve spool 196. This valve spool has two lobes 198 and 199 slidably arranged in a cylindrical chamber 200. The left lobe 198 is operatively associated with a return port 201. The right lobe 199 is operatively associated with a pressure port 202. The actuating port 174 communicates with the chamber 200 intermediate the lobes 198 and 199. The pressure port 202 is intermediate the lobes 198 and 199. The pressure port 202 is supplied with fluid under pressure via the branch line 203 which communicates with the main supply line 186. The drain port 201 is shown as communicating with a drain line 204 in which a spring biased check valve 205 is shown as being arranged. This drain line 204 also communicates with a sump chamber 206 into which the nozzles 194 and 195 discharge fluid. These nozzles are supplied with fluid via connecting branch lines 208, 209 and 210, line 209 leading to the nozzle 195 and line 210 leading to the nozzle 194. A restrictor 211 is shown as arranged in the line 209 and a similar restrictor 212 is shown as arranged in the line 210.

The valve spool 196 is shown as having a coaxially extending stub 213 which is slidably arranged in an opening through a transverse wall 214 in the chamber 200 so as to provide a drive chamber 215 and a feedback chamber 216. Spring 218 is shown as arranged in the feedback chamber 216 and at opposite ends bears against the outer end wall of such chamber and the outer end face of the spool stub 213. The opposite end wall of the chamber 200 is spaced from the outer end face of the left lobe 198 to provide a drive chamber 219 in which a spring 220 is arranged, one end thereof bearing against the end wall of the chamber and the other end against the end face of the lobe 198.

The drive chamber 219 communicates with the line 210 on the downstream side of the restrictor 212 therein via a branch line 221. The drive chamber 215 communicates with the line 209 on the downstream side of the restrictor 211 therein via a branch line 222. The feedback chamber 216 communicates with the line 184 via a branch line 223. The actuating port 174 communicates also with the line 184 via an actuating line 224.

Like the other electrohydraulic servovalves previously described, the servovalve 175 includes a polarized electrical force or torque motor indicated generally at 228 and having an armature 225 rigidly connected to the flapper 193. The armature-flapper member 225, 193 is mounted for pivotal movement on a flexure tube 226 which also serves to isolate the motor section from the hydraulic section of the servovalve. The armature 225 is movably arranged between the spaced pole pieces of the torque motor. Two coils 229 and 230 are operatively associated with the armature 225 and with a servo amplifier 231. This amplifier in turn is operatively associated with a summing amplifier 232 to which an electrical command signal input can be fed, as well as electrical feedback signals conducted through conductors 233 and 234 severally leading to the electrical feedback transducers 235 and 236, respectively. The transducers 235 and 236 may be of any suitable type such as the linear variable differential transformer type previously mentioned. As such, each transducer would have a suitable slug or element (not shown) connected by a stem to the corresponding injector valve. Thus, the transducer 235 is operatively associated through the connector 238 with the injector valve member 158. The other transducer 236 has a similar connector 239 operatively associating the transducer with the other injector valve member 159.

One of the distinguishing features of the embodiment shown in FIG. 7 is that fluid is injected into the nozzle passage 18 through a plurality of orifices. Such an arrangement permits a plurality of jets of fluid to be injected into the main stream of fluid flowing through the nozzle passage 18 and provides a more effective way of providing a shock wave than if a single jet were used, especially where greater angular deflections $\alpha$ are required. It will be noted that when either of the injector valve members 158 and 159 opens, it moves as a unitary structure so as to move all of its closure elements simultaneously and a like distance.

When no electrical command signal input is being fed to the servovalve 175, the biasing springs 181 and 182 urge the corresponding injector valves 158 and 159 to closed positions. If the servovalve 175 is actuated so as to move the valve spool 196 to the right as viewed in FIG. 7, the pressure port 202 is placed in communication with the actuating port 174 and thereby fluid under supply pressure is introduced into the connecting lines 224, 173 and 184. This subjects the outer left end face of the piston 171 to supply pressure and since the area of such end face is greater than the cross-sectional area of the stem portion of the valve member 158 intermediate the piston 171 and head 160, this valve member will be urged to the right so as to press the pintles or closure elements 161 firmly against their seats 164 and close off the outlets 163. At the same time, supply pressure acting upon the inner or left end face of the piston 182 which has a larger area than its right end face will cause the injector valve member 159 to move from left to right thereby opening. Such opening will be against the urging of not only the spring 192 but the force created by supply pressure bearing against the outer or right end face area of the piston 182.

The rightward movement of the valve spool 196 will be caused if the error or net electrical signal fed to the servovalve 175 is such as to electromagnetically induce the armature-flapper member 225, 193 to pivot in a clockwise direction so as to bring the flapper closer to the left nozzle 194 and correspondingly farther away from the right nozzle 195. This produces a pressure differential in the nozzle chambers which is transmitted to the spool drive chambers 219 and 215, the predominant pressure being in the left chamber 219. As soon as the spool moves to the right to connect the pressure port 202 with the actuating port 174, pressure feedback is transmitted through the line 223 to the feedback chamber 216. Thus, displacement of valve spool 196 is controlled jointly by the electrical signal input and by the reaction of the load with which the valve is associated. The valve spool 196 will move until a force balance is reached between the hydraulic drive forces and the forces of the spool springs 218 and 220. This pressure feedback reduces the servovalve pressure-versus-signal gain making it possible to adjust injector valve deadband by varying preload force thereon.

As the right injector valve member 159 opens in the situation assumed, the transducer 236 will generate an electrical signal fed back through the conductor 234 to the summing amplifier 232 to counteract the electrical command signal input and thereby gradually reduce the error signal fed to the motor coils 229 and 230. When the electrical feedback signal cancels out the electrical command signal input, no error signal is fed to the torque motor 228 and the valve spool returns to a centered or null position thereby cutting off further flow through the actuating port 174. This will leave the injector valve 159 opened a predetermined amount proportionate to the electrical command signal input. Thus, the sum of the areas of the orifices provided by the three unseated valve closure elements 166 will provide an effective orifice area which is variable but proportionate to the electrical command signal input.

Assume now that the sign of the electrical command signal input is opposite to the previously considered so that the armature-flapper member 225, 193 is urged to pivot in a counterclockwise direction. This swings the flapper 193 closer to the right nozzle 195 and correspondingly farther away from the left nozzle 194. As a consequence, a pressure differential is established in the nozzle chambers and corresponding drive chambers 215 and 219 with the predominant pressure in the right chamber 215. This will cause the spool to displace to the left thereby maintaining pressure port 202 covered but uncovering drain port 201 and placing the same in communication with actuating port 174. Through the connected lines 224, 173 and 184, the associated end portions of the cylinders 172 and 183 are connected to drain. With opposite sides of the piston 171 now connected to drain in effect, the fluid under supply pressure in the chamber 162 will act to move to the left or retract the valve member 158 thereby unseating the closure elements 161 and providing orifice areas through which fluid under substantially constant supply pressure is discharged. Considering the other injector valve member 159, with the inner or left end face of its piston 182 connected to drain and with the outer or right end face or such piston, albeit smaller, connected to supply pressure, this valve member 159 is more firmly urged to a closed position.

Here again, the unseated valve closure elements 161 jointly with their spaced seats 164 collectively provide an effective orifice area which is proportionate to the strength of the electrical command signal input.

While the pressure flow servovalve 175 shown is of the three-way type, it is similar in principle to the four-way pressure flow servovalve more fully disclosed as to construction and operation in U.S. Pat. No. 2,964,059.

FIG. 9

The embodiment of the present invention shown in FIG. 9 comprises an electrohydraulic mechanical feedback flow control valve of the type described hereinabove in connection with FIG. 5, and a plurality of individual valves with electrical feedback to the servovalve being from means which sense the flow of fluid through open injector valves.

Figure 9:
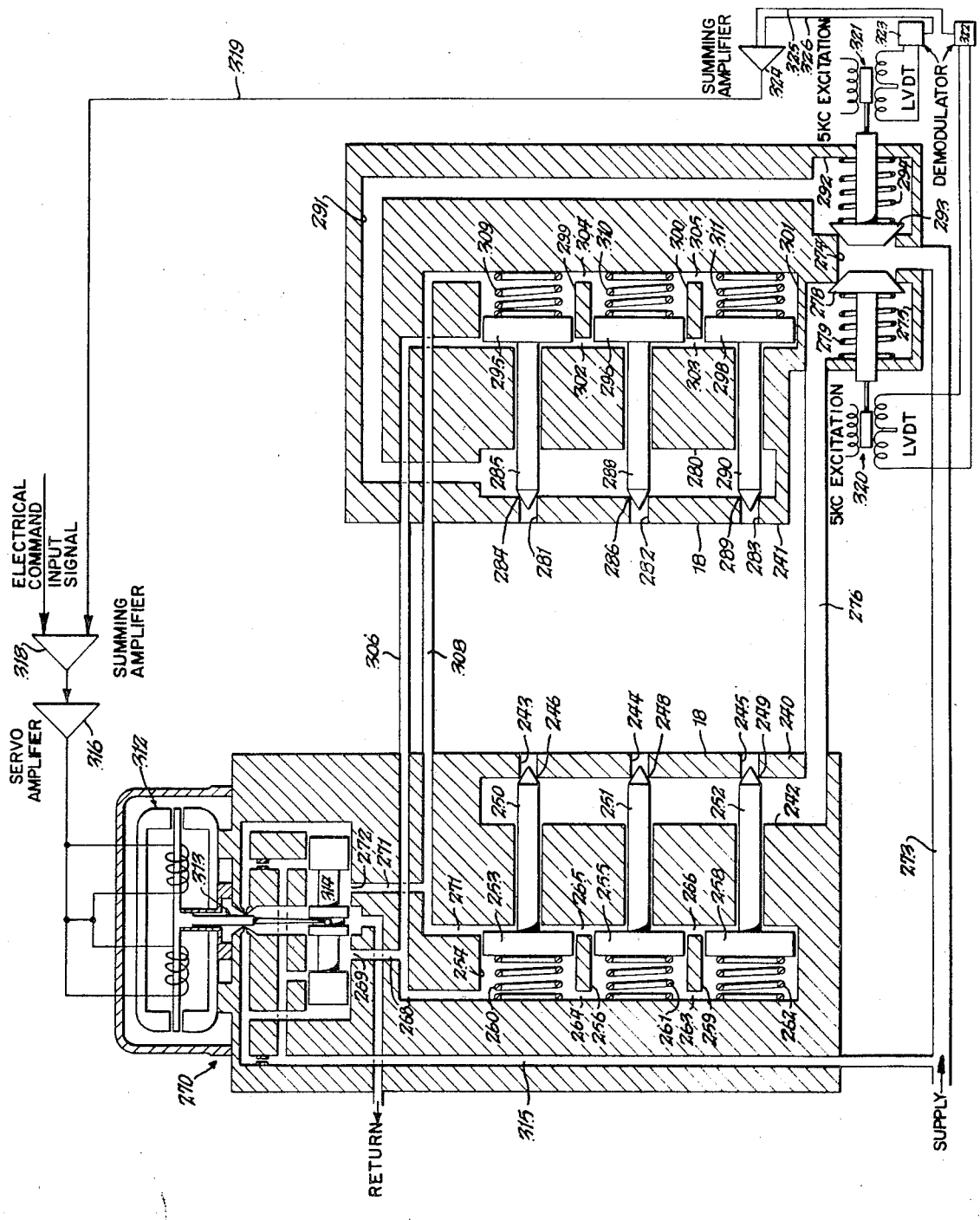
FIG. 9 is a fourth diagrammatic embodiment of the invention.

Referring to FIG. 9, the numerals 240 and 241 represent diametrically opposite wall portions of the nozzle divergent section 17 providing the passage 18 therebetween. The body 240 is shown as formed to provide a chamber 242 having a plurality of outlets 243, 244 and 245 surrounded by valve seats 246, 248 and 249, respectively. While any number of chamber outlets may be shown, three have been illustrated. A valve 250 is slidably arranged on the body 240 to be moved toward and away from the seat 246 and thereby control flow through the outlet 243. A similar valve 251 is operatively associated with the outlet 244 and still another similar valve 252 is operatively associated with the outlet 245.

The valves 250, 251 and 252 are movable independently of one another and this is accomplished by fluid operated means. Thus, the valve 250 carries a piston head 253 slidably arranged in a cylinder 254. The outer end of the valve 251 carries a piston 255 slidably arranged in a cylinder 256. The outer end of the valve 252 carries a piston 258 slidably arranged in a cylinder 259. The valves 250, 251 and 252 are severally urged to the right or to a closed position by independent biasing springs 260, 261 and 262, respectively, which have different spring rates.

The corresponding ends of the cylinders 254, 256 and 259 are manifolded or connected together. Thus, the outer ends of the cylinders 256 and 259 are connected by a passage 263. A similar passage 264 connects the corresponding outer ends of the cylinders 254 and 256. The inner and corresponding ends of the chambers 254 and 256 are connected by a passage 265. A similar passage 266 connects the inner corresponding ends of the cylinders 256 and 259. The outer end of the cylinder 254 is connected via a line 268 with an actuating port 269 of an electrohydraulic servovalve indicated generally at 270. The inner or right end of the cylinder 254 is connected via a line 271 with an actuating port 272 of the servovalve 270.

Fluid under substantially constant pressure is supplied to the chamber 242 from a main supply line 273. This line 273 communicates with an inlet chamber 274 adapted to communicate with an outlet chamber 275 in turn connected by a line 276 leading to the chamber 242. A SPRING-loaded valve 278 which acts as a flow-sensing element is urged to a closed position by a spring 279 to as to cut off communication between the inlet and outlet chambers 274 and 275, respectively.

Considering now the body member 241, the same is internally formed to provide a chamber 280 having a plurality of outlets, three being shown at 281, 282 and 283. The outlet 281 is surrounded by an annular seat 284 with respect to which an injector valve 285 is movable. The outlet 282 is surrounded by an annular seat 286 with respect to which another injector valve 288 is movable. The outlet 283 is surrounded by an annular seat 289 with respect to which still another injector valve 290 is movable. The chamber 280 is supplied by fluid under pressure through a line 291 connected to an outlet chamber 292. The outlet chamber 292 and inlet chamber 274 are adapted to connect with each other when a spring loaded valve 293, shown closed, is retracted. The valve 293 is urged to a closed position by a spring 294 arranged in the outlet chamber 292. The valve 293 also acts as a flow-sensing element.

At their outer ends, the injector valves 285, 288 and 290 severally carry pistons 295, 296 and 298, respectively. These pistons are arranged in cylinders 299, 300 and 301, respectively. These cylinders are manifolded together. Thus, the inner or left ends of the cylinders 299 and 300 are connected by a passage 302 and the cylinders 300 and 301 are connected by a similar passage 303. The outer or right ends of the cylinders 299 and 300 are connected by a passage 304 and the cylinders 300 and 301 are connected by a similar passage 305. The front or left end of the cylinder 299 is connected via a line 306 with the left actuating line 268. The outer or right end of the cylinder 299 is connected via a line 308 to the right actuating line 271. Biasing springs 309, 310 and 311 are arranged in the cylinders 299, 300 and 301, respectively, between the outer end walls thereof and the corresponding piston. These return springs urge the corresponding injector valves 285, 288 and 290 to the left or closed position.

The electrohydraulic mechanical feedback flow control servovalve 270, being similar to the servovalve 21 shown in FIG. 5, will not be redescribed in detail except to note that it has a torque motor 312, a first stage hydraulic amplifier 313 and a second stage valve spool 314. The hydraulic amplifier 313 is supplied with fluid via a branch line 315 which communicates with the main supply line 273. Displacement of the valve spool 314 controls the connection of the actuating ports 269 and 272 alternatively to drain or pressure supply. The torque motor 312 has coils which are supplied with an error signal from a servo amplifier 316. This servo amplifier is fed a signal from a summing amplifier 318 to which an electrical command input signal is fed as well as a feedback signal conducted through the conductor 319.

In connection with the electrical feedback, the valves 278 and 293 act alternatively as flowmeters and are shown as severally operatively associated with linear variable differential transformers 320 and 321, respectively. Each such transformer has an electrically excited primary winding, secondary windings and a movable core or slug suitably connected to the stem of the corresponding one of the valves 278 and 293. The secondaries of these transformers are associated severally with demodulators 322 and 323 from which electrical signals are fed to a summing amplifier 324 by conductors 325 and 326, respectively.

When fluid flow occurs in the line 276, as occasioned by opening of one or more of the injector valves 250-252 constituting the left bank thereof, a pressure differential is developed across the left flowmeter valve 278 and when sufficient to overcome the return spring 279 this flowmeter valve opens to establish communication between chambers 274 and 275. Movement of this flowmeter valve causes the left transformer 320 to generate an electrical signal which is fed back ultimately to the summing amplifier 318. When the left flowmeter valve 278 is open, the right flowmeter valve 293 remains closed.

In like manner, when fluid flow occurs in the line 291, due to opening of one or more of the injector valves 285, 288 and 290 constituting the right bank of the same, a pressure differential develops across the right flowmeter valve 293 and when sufficient to overcome the force exerted by the return spring 294 this flowmeter valve opens, thereby allowing fluid to flow from the inlet chamber 274 to the outlet chamber 292. Such movement of the right flowmeter valve 293, while the left flowmeter valve 278 remains closed, causes the right transformer 321 to generate an electrical signal which is fed back eventually to the summing amplifier 318.

In the case of both flowmeter valves 278 and 293, each tries to maintain a pressure drop across it achieved by the balance between hydraulic forces acting upon it and the force of its return spring 279 or 294. Since the opening of the flowmeter valve 278 or 293 is proportionately responsive to the opening of one or more injector valves associated therewith, and operation of the latter is proportionate to electrical command signal input, the operation of the flowmeter valves is proportionate to such electrical input.

One of the distinguishing features of the embodiment shown in FIG. 9 is that the various injector valve springs 260–262 and 309–311 have in each bank different spring rates so that for a given flow rate determined by the servovalve 270 one of the pairs of corresponding injector valves, say valves 250 and 285, would be operated while the other injector valves remain closed. As the flow rate increases, one of another pair of corresponding injector valves, say the valve 251 and 288 would open, and so on. In other words, for greater angular deflection of the thrust vector V (FIG. 2), instead of the entire quantity of fluid required to effect the deflection being discharged through one orifice, it is discharged through a plurality of orifices which progressively increase in number as the quantity of injectant fluid increases. Such an arrangement is termed multipoint location of the variable orifices.

Referring to FIG. 8, which represents a view similar to FIG. 2 there is shown a triangular pattern of individual injector valve locations arranged in four vertical rows labeled 1, 2, 3, 4. Row 1 has a single injector orifice or location, row 2 has two, row 3 has three and row 4 has four. If a small angular deflection of the thrust vector is called for, injectant fluid will be introduced only from the single location in row 1. If more injectant fluid is demanded, the two locations in row may become operative, and so on. What determines the actuation of additional injectors is the spring rate characteristics of the various injector valve springs as shown in the embodiment of FIG. 9.

FIG. 10

Figure 10:
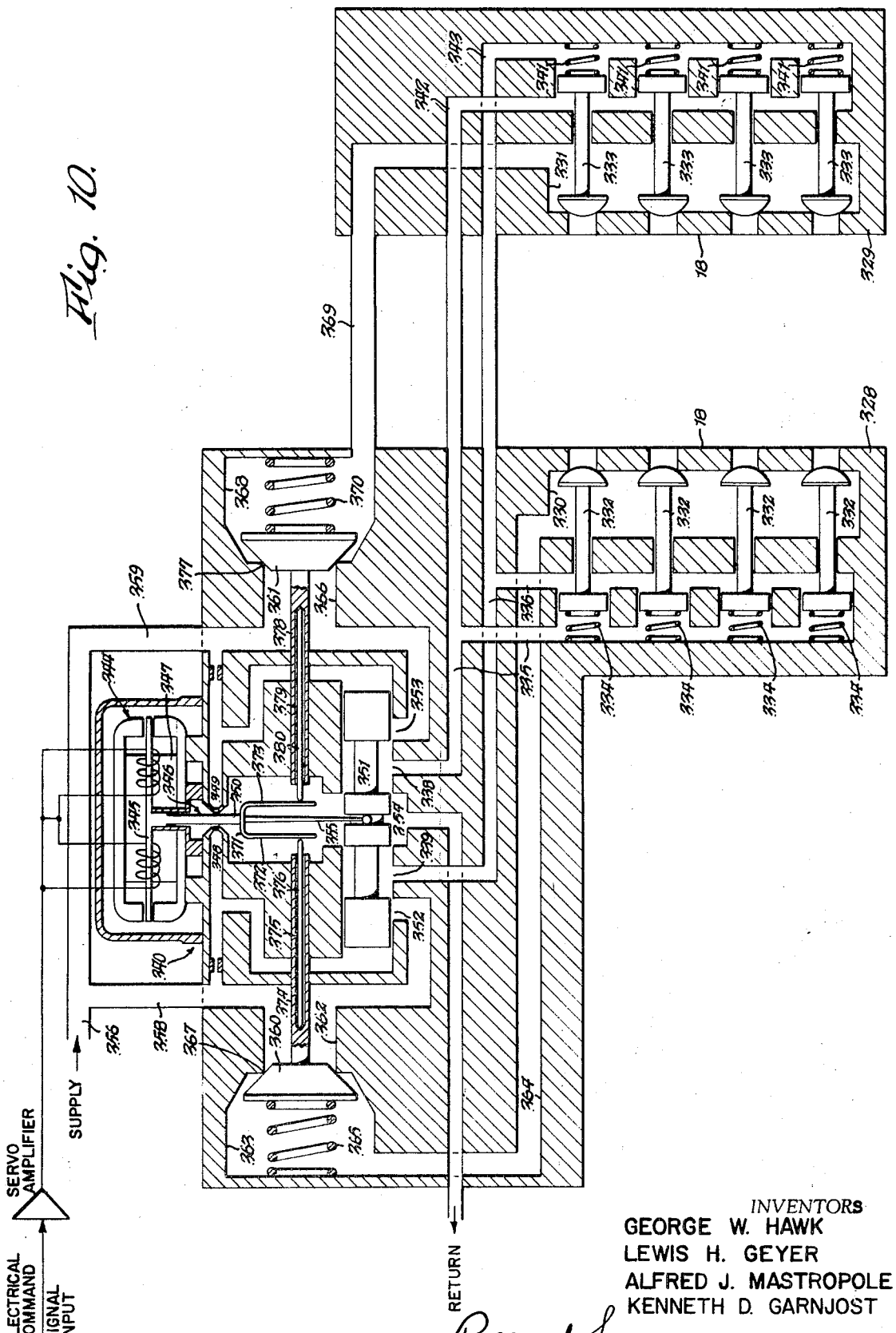
FIG. 10 is a fifth diagrammatic embodiment of the invention.

The embodiment of the present invention shown in FIG. 10 includes an electrohydraulic flow control servovalve arranged to operate a plurality of manifolded individual injector valves with mechanical force feedback from these injector valves to the servovalve through flowmeter valve means.

Referring to FIG. 10, the body member 328 and 329 are to be considered as diametrically opposite wall portions of the nozzle divergent section 17 to provide the passage 18 therebetween. The body members 328 and 329 are severally formed to provide chambers 330 and 331, respectively, which are each supplied with injectant fluid under substantially constant pressure, in a manner hereinafter explained.

The chamber 330 has a plurality of outlets each of which is associated with an injector valve 332, four such valves being shown. Similarly the chamber 331 has a like number of outlets with each of which an injector valve 333 is associated. Injector valves 332 severally have backup or return springs 334 and are fluid operated through actuating lines 335 and 336 which lead to actuating ports 338 and 339, respectively, of the servovalve indicated generally at 340. The other injector valves 333 severally have biasing springs 341 urging them to a closed position and these valves are fluid operated by branch lines 342 and 343 which communicate with the actuating lines 335 and 336, respectively.

While the heads of the valves 332 and 333 shown in FIG. 10 are different from the injector valves 250–252 and 285, 288 and 290 shown in FIG. 9, they are otherwise generally similar in construction and operation with their respective biasing springs varying as to spring rate so as to provide progressive opening of the various valves as the demand for injectant fluid increases.

The servovalve 240 is generally of the construction shown in FIGS. 5 and 9, except for the feature of mechanical feedback to the armature-flapper member. The servovalve comprises a torque motor 344, a first stage hydraulic amplifier 346 and a second stage valve spool 351. The torque motor 344 has an armature 345 movably arranged between spaced pole pieces which are operatively associated with permanent magnets, one of which is shown at 347, and coils. The hydraulic amplifier 346 has a pair of nozzles 348 and 349 and a flapper 350. The valve spool 351 is operatively associated with pressure ports 352 and 353 and a return port 354. Mechanical feedback between the valve spool 351 and the flapper 350 is achieved through the feedback spring wire 355. The left nozzle 348 and the left pressure port 352 are supplied with fluid under substantially constant pressure from a main supply line 356 through a branch line 358. The right nozzle 349 and the right pressure port 353 are serviced through a second branch line 359 from the main supply line 356.

Means are arranged to sense the flow of fluid supplied to the chambers 330 and 331 and to feed back a mechanical force to the flapper 350 in the servovalve 340. Such means are shown as comprising left and right flowmeter valves 360 and 361, respectively. The left valve 360 is adapted to close off communication between an inlet chamber 362 communicating with the branch line 358 and an outlet chamber 363 having an outlet line 364 leading to the chamber 330. This valve 360 is urged toward a closed condition against an annular seat 367 by a return spring 365 arranged in the outlet compartment 363 and operatively interposed between the end wall thereof and the valve.

The right flowmeter valve 361 is arranged to close off communication between an inlet chamber 366 communicating with the branch line 359 and an outlet chamber 368 having an outlet line 369 leading to the chamber 331. A spring 370 in outlet chamber 368 constantly urges the valve 361 toward a closed position against an annular seat 377.

In order to cause the flowmeter valves 360 and 361 to apply a mechanical feedback force to the flapper 350 proportionate to the displacement of either of such valves, the flapper 350 is shown as carrying a U-shaped feedback spring 371 having a pair of down-turned leaves 372 and 373 arranged on opposite sides of the feedback spring wire 355. The left valve 360 has an elongated stem 374 by which the valve is guided for rectilinear movement on the body member 328. The free end portion of this stem is recessed as indicated at 375 and a push rod 376 having pointed ends is arranged within this recess 375 so that one end bears against the base of the recess and the other end bears against the leaf 372. Similarly, the right valve 361 has an elongated stem 378 provided with a recess 379 in which a push rod 380 is arranged so that one end bears against the base of this recess and the other end against the leaf 373. The feedback spring 371 is prestressed so that the leaves 372 and 373 thereof tend to swing outwardly.

The permanent magnet 347 of the torque motor 344 exerts a decentering effect or gradient upon the armature 345 which substantially balances out the various natural centering spring effects present, leaving the armature-flapper member 345, 350 free to move in response to any difference between the electrically induced force and the feedback spring force exerted by the spring 371. A more detailed explanation of the operation of a servovalve having mechanical feedback between a displaceable member driven by the servovalve and the armature-flapper member of the servovalve, is contained within the disclosure of the pending U.S. Pat. application of Chaves et al., Ser. No. 70,999, filed Nov. 22, 1960 and entitled Servoactuator, now U.S. Pat. No. 3,065,735 issued Nov. 27, 1962.

When an electrical command signal input is amplified and fed into the torque motor 354, the armature-flapper member 345, 350 will pivot. Let us assume first that it pivots in a clockwise direction as viewed in FIG. 10. This will produce a higher pressure in the chamber of nozzle 348 than in that of nozzle 349. This pressure differential is applied to the ends of the spool 351 causing the same to displace from left to right, thereby placing right pressure port 353 in communication with right actuating port 338 and placing return port 354 in communication with left actuating port 339. This will cause a higher pressure in line 342 than in line 343 for the piston and cylinder devices of the right bank of injector valves 333 and these valves will open successively depending upon the spring rates of their respective springs 341 and the strength of the electrical command signal input. At the same time, the left bank of injector valves 332 will be more forcefully urged to remain in their closed positions.

As soon as one of the right injector valves 333 opens flow through the corresponding outlet for the chamber 331 will cause a pressure differential to exist across the right flowmeter valve 361. When this pressure differential is great enough to overcome the urging of the valve return spring 370, this valve will open and flow will occur from branch line 359 through now communicating chambers 366 and 368 into line 369 and thence into chamber 331. Opening or rightward movement of the right valve 361 will continue until a force balance is reached. Such movement removes the backup support provided by the pushrod 380 for the leaf 373. The consequence of this is that the other leaf 372 now exerts a mechanical feedback force urging the armature-flapper member 345, 350 to pivot in a counterclockwise direction to produce a balance between the electrical input and mechanical feedback forces.

In this manner proportionality between position of the flow sensing element or right flowmeter valve 361 and the electrical input to the coils of the torque motor 344 is achieved through action of the feedback spring 371 which exerts a force responsive to the extent of movement of this valve 361.

In a similar fashion, if it be assumed that the armature-flapper member 345, 350 pivots in a counterclockwise direction as viewed in FIG. 10, the valve spool 351 will shift from right to left so as to pressurize lines 336 and 343 and connect lines 335 and 342 to drain. This causes one or more of the left injector valves 332 to open while all of the right injector valves 333 are urged more firmly to retain their closed condition. When one or more of the left injector valves 332 opens fluid flow occurs in the line 364 on the downstream side of the left flowmeter valve 360. Since fluid under supply pressure is on the opposite side of this valve, a pressure differential is produced across this valve so that when sufficient to overcome the force of the return spring 365 this valve will open allowing flow to continue into the line 364 leading to chamber 330. When the left flowmeter valve 360 lifts away from its seat 367, the left leaf 372 of the feedback spring 371 is partially relieved, thereby allowing the force exerted by the right leaf 373 to predominate and urge the armature-flapper member 345, 350 to pivot in a clockwise direction. The armature-flapper member will move until a balance of the forces acting thereon, due to the electrically induced force and the mechanical feedback force, is achieved. When this occurs the displaced position of the left flowmeter valve 360 will be proportionate to the electrical input to the torque motor 344.

FIGS. 11–13

Figure 11:
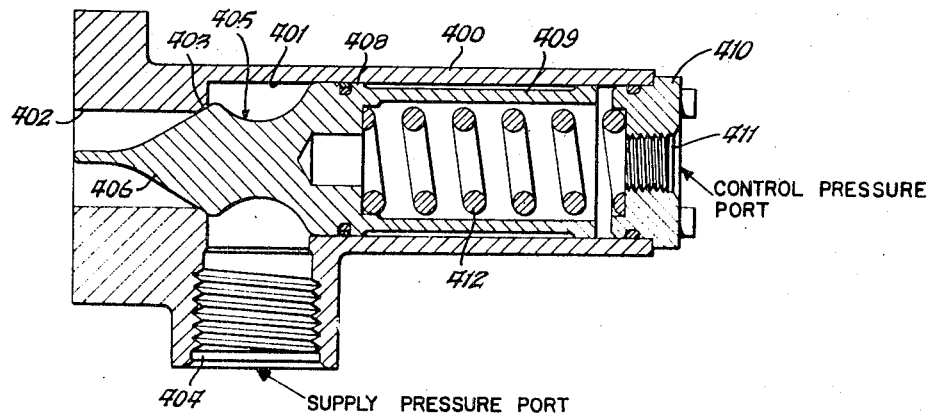
FIG. 11 is a central longitudinal sectional view through a valve means which may be utilized for any of the valves shown in the various embodiments of the invention.
Figure 12:
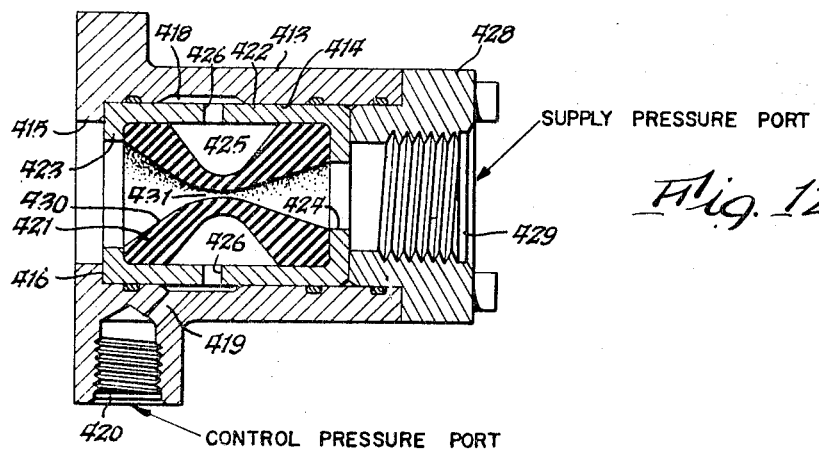
FIG. 12 is a central longitudinal sectional view through another construction of valve means which may be utilized in any of the embodiments described.
Figure 13:
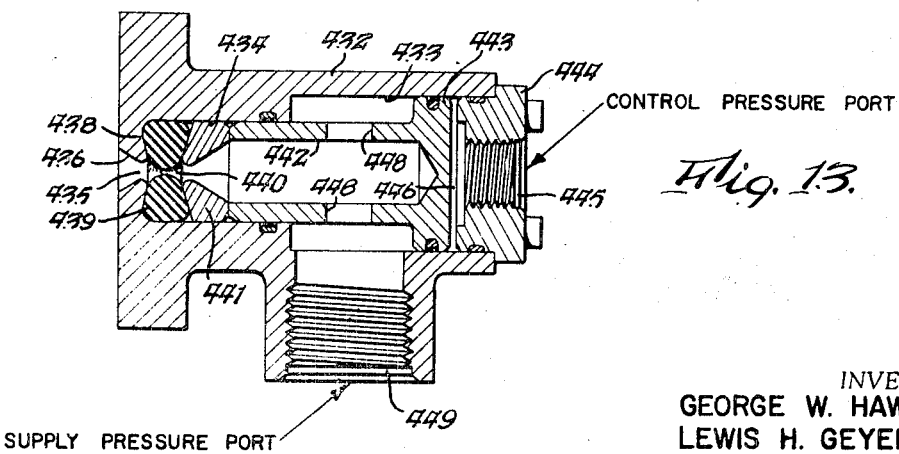
FIG. 13 is a central longitudinal sectional view through still another construction of valve means which may be utilized in any of the embodiments described.

FIGS. 11, 12 and 13 show different specific constructions of injector valve means which may be utilized in any of the embodiments of the present invention previously described, provided the pressure of the fluid handled by the servovalve is higher than the pressure of the injectant fluid, for a reason which will become apparent hereinafter. This is readily achieved by having a fluid supply for the servovalve separate from the fluid supply for the injector valves as shown in FIG. 3. For simplicity, the same fluid supply is shown used for both in the embodiments of FIGS. 5, 6, 7, 9 and 10.

The valve means shown in FIG. 11 comprises a body member 400 having a stepped cylindrical bore therethrough including a larger diameter portion 401 at one end and a small diameter portion 402 at the other end. The corner of the shoulder between the bore portions 401 and 402 are provides am annular seat 403, A supply pressure port 404 leads to the larger bore portion 401 adjacent the seat 403. Slidably arranged within this bore portion 401 is a valve member 405 having a conical head 406 adapted to engage the seat 403, an intermediate enlarged piston portion 408 slidably engaging the bore portion 401 and a barrel portion 409 extending axially from the intermediate piston portion 408 on the side thereof opposite from the head 406. The outer end of the larger bore portion 401 is shown as closed by a removable plug 410 having a control pressure port 411 extending centrally therethrough. Arranged between the plug 410 and the piston head portion 408 of the valve is a helical compression spring 412.

With fluid under substantially constant pressure always present in the pressure supply port 404, whether the valve 405 is closed or opened, it will be seen that this pressure urges the valve to an open position or to the right as viewed in FIG. 11 against the urging of the return spring 412 and the pressure of control fluid present within the barrel 409 and introduced through the pressure control port 411. By controlling through port 411 the pressure of the control fluid communicating with the interior of the valve barrel 409, the position of the valve head 408 relative to its seat 403 can be controlled. Increasing the pressure of the control fluid closes the valve 405 and reducing the pressure of such fluid allows this valve to open.

Referring to FIG. 12, the valve means there shown comprises a body member 413 having a stepped cylindrical bore extending therethrough including a large diameter portion 414 adjacent one end and a smaller diameter portion 415 adjacent its other end to provide a shoulder 416 therebetween. The intermediate region of the large diameter bore portion 414 is provided with an annular recess or groove 418 which communicates through the passage 419 with a control pressure port 420. Arranged within the bore portion 414 is a contractable annular sphincteral valve element 421. This element is made of elastomeric material in the form of a tube or sleeve having a relatively thin wall in its central portion and thicker walls adjacent its ends. This element 421 is shown as arranged within a metal retainer 422 which is in the form of a sleeve having inturned annular end flanges 423 and 424. The end portions of the elastomeric sphincteral element 421 are suitably bonded to the metal retainer 422. The space between the outer wall of the element 421 intermediate its ends and the surrounding metal retainer 422 provides an annular chamber 425 which communicates with the groove 418 through one or more radial passages 426 provided in the wall of the retainer 422. This retainer is held against the shoulder 416 by a removable plug 428 having a central supply pressure port 429 extending therethrough. This port 429 communicates with one end of a passage 430 which extends longitudinally through the sphincteral valve element 421. The constricted central section of this passage as indicated at 431 provides an orifice the area of which can be adjusted by introducing fluid under pressure through port 420, such fluid communicating with the annular chamber 425 surrounding the restricted passage portion 431. Fluid under substantially constant pressure supplied to the port 429 is conducted to variable orifice 431.

Another embodiment of the valve means employing a contractable annular sphincteral element is illustrated in FIG. 13. There the numeral 432 represents a body member having a stepped cylindrical through bore including a large diameter portion 433 adjacent one end, an intermediate portion 434 of smaller diameter, a reduced throat portion 435 which flares to the opposite end face of the body member as indicated at 436. A conical shoulder 438 is shown as provided between the throat section 435 and intermediate portion 434. Against this shoulder fits a sphincteral ring 439 of elastomeric material. This ring is shown as having a central hole 440 therethrough defined by rounded walls which taper divergently radially outwardly. The outer or left axially facing side of the ring 439 engages the shoulder 438 and arranged on the other or right axially facing side of the sphincteral ring and engaging the same is a metal gland 441. This gland 441 is an annular element backed up by the tubular extension 442 of a piston 443. The piston 443 is slidably arranged in the larger bore portion 433 while the piston neck is slidably arranged in the smaller bore portion 434. The outer end of the larger bore portion 433 is closed by a removable plug 444 having a control pressure port 445 extending centrally therethrough. Thus, the pressure of fluid in the chamber 446 to the right of the piston 443 can be controlled through port 445. The piston neck 442 is shown as provided with one or more radial holes 448. Fluid under substantially constant supply pressure is introduced through port 449 into the space surrounding piston neck 442 and into the interior of such neck so that supply pressure can be applied effectively to the left-hand end face of the piston head 443 and also can be supplied to the orifice 440. This orifice 440 has a variable transverse area depending upon the degree to which the sphincteral ring 439 has been axially compressed by movement of the piston member 442, 443. Movement of this piston member is under control of the relative pressures admitted through the ports 445 and 449.

In the various forms of valve means shown in FIGS. 11–13, it will be understood, as is apparent to those skilled in the art, that the supply pressure ports are connected to a suitable source of injectant fluid maintained under a substantially constant pressure and the control pressure ports are operatively associated with a servovalve operating on a fluid, perhaps different from the injectant fluid as to composition and likely so, supplied at a higher pressure so that the pressure of control fluid may be higher in value than that of injectant fluid.

As used herein, fluid for injection purposes is intended to cover all suitable liquids, gases, suspensions of liquid droplets in a gas, suspensions of solid particles in a gas, or suspensions of solid particles in a liquid, or mixtures of the same. A liquid is preferred as the injectant fluid, particularly one having a high density to reduce required storage volume, good stability and reasonable lack of toxicity, low specific heat, low heat of vaporization and low heat of formation to reduce the amount of energy removed from the primary gas stream F flowing through the nozzle. Examples of good liquids for use as the injectant fluid include various freon compounds, bromine compounds and mercury.

In the embodiments of the invention shown in FIGS. 5, 6, 7, 9 and 10, the various injector valves, valve spools and flowmeter valves, have been illustrated in a closed condition. Also, it is to be noted that all servovalves in these embodiments load the closed injector valve or valves on one side of the nozzle passage in the presence of any static friction to assure closure of the same before opening of any injector valve on the opposite side of the nozzle passage. Regarding those injector valves shown with biasing springs, these springs are strong enough to hold their respective valves closed even though pressure in the operating fluid may not be present. Even in those cases which do illustrate the injector valves as being only fluid pressure biased, it may be desireable to provide backup springs to keep the injector valves closed during storage.

From the foregoing, it will be seen that the present invention provides thrust vector control by secondary injection of fluid which is injected into the primary gas stream at substantially constant velocity regardless of the amount of fluid injected, the amount controlling the extent of angular deflection of thrust vector desired. The various embodiments of apparatus for practicing the invention illustrate some of the ways in which an orifice of variable area can be provided and supplied with fluid under substantially constant pressure. Other modifications of the invention may occur to those skilled in the art and hence the scope of the present invention is not limited to the particular embodiments illustrated but is to be measured by the appended claims.

What is claimed is:

1. The method of controlling the angular deflection of the thrust vector of a fluid stream discharged from the divergent section of a supersonic nozzle, which comprises the step of injecting fluid into said stream transversely thereof in an amount variable according to the extent of thrust vector deflection desired but at a substantially constant velocity regardless of the amount of fluid injected.

2. The method of controlling the angular deflection in a single plane of the thrust vector of a fluid stream discharged from the divergent section of a supersonic nozzle, which comprises the step of injecting fluid alternatively and opposingly from separated locations in said plane into said stream transversely thereof in an amount variable according to the extent of thrust vector deflection desired but at a substantially constant velocity regardless of the amount of fluid injected.

3. The method of controlling the angular deflection of the thrust vector of a fluid stream discharged from the divergent section of a supersonic nozzle, which comprises the step of injecting fluid alternatively and opposingly from separated locations in a first plane into said stream transversely thereof, and the step of injecting fluid alternatively and opposingly from other separated locations in a second plane angularly disposed with respect to said first plane, the amount of fluid injected in each of said planes varying according to the extent of the component in such plane at the resultant thrust vector deflection desired but being injected at a substantially constant velocity regardless of the amount of fluid injected.

4. In apparatus for controlling the angular deflection of the thrust vector of a fluid stream discharged from the divergent section of a supersonic nozzle, the combination therewith of means arranged to inject fluid into said stream and in a direction generally transverse thereof at a substantially constant velocity regardless of the amount of fluid injected, including means providing a variable orifice area and means for supplying fluid under substantially constant pressure to said area.

5. In apparatus for controlling the angular deflection of the thrust vector of a fluid stream discharged from the divergent section of a supersonic nozzle, the combination therewith of first means arranged to inject fluid from one side of said section into said stream and in a direction generally transverse thereof, and second means arranged to inject fluid from the other side of said section into said stream and in a direction generally transverse thereof, each of said first and second means being operative to inject fluid at a substantially constant velocity regardless of the amount of fluid injected and including means providing a variable orifice area and means for supplying fluid under substantially constant pressure to said area.

6. In apparatus for controlling the angular deflection of the thrust vector of a fluid stream discharged from the divergent section of a supersonic nozzle having an annular wall, the combination therewith of first means arranged to inject fluid from a first location on said wall into said stream and in a direction generally transverse thereof, and second means arranged to inject fluid from a second location on said wall diametrically opposite from said first location into said stream and in a direction generally transverse thereof, each of said first and second means being operative to inject fluid at a substantially constant velocity regardless of the amount of fluid injected and including means providing a variable orifice area and means for supplying fluid under substantially constant pressure to said area.

7. In apparatus for controlling the angular deflection of a fluid stream discharged from the divergent section of a supersonic nozzle having an annular wall, the combination therewith of first means arranged to inject fluid from a first location in said wall into said stream and in a direction generally transverse thereof, second means arranged to inject fluid from a second location on said wall into said stream and in a direction generally transverse thereof, said first and second locations being symmetrically related to a first diametral plane, third means arranged to inject fluid from a third location on said wall into said stream and in a direction generally transverse thereof, and fourth means arranged to inject fluid from a fourth location on said wall into said stream and in a direction generally transverse thereof, said third and fourth locations being symmetrically related to a second diametral plane perpendicular to said first plane, each of said first, second, third and fourth means being operative to inject fluid at a substantially constant velocity regardless of the amount of fluid injected and including means providing a variable orifice area and means for supplying fluid under substantially constant pressure to said area.

8. In apparatus for controlling the angular deflection of a fluid stream discharged from the divergent section of a supersonic nozzle having an annular wall, the combination therewith of first, second, third and fourth means severally arranged to inject fluid into said stream and in a direction generally transverse thereof from respective locations on said wall such that two of said locations are diametrically opposite each other and the other two of said locations are also diametrically opposite each other but arranged in a diametral plane which is perpendicular to that in which said first-mentioned pair is arranged, each of said first, second, third and fourth means being operative to inject fluid at a substantially constant velocity regardless of the amount of fluid injected and including means providing a variable orifice area and means for supplying fluid under substantially constant pressure to said area.

9. In apparatus for controlling the angular deflection of the thrust vector of a fluid stream discharged from the divergent section of a supersonic nozzle, the combination therewith of first means arranged to inject a plurality of jets of fluid from one side of said section into said stream and in a direction generally transverse thereof, and second means arranged to inject a plurality of jets of fluid from the other side of said section into said stream and in a direction generally transverse thereof, each of said first and second means being operative to inject fluid at a substantially constant velocity regardless of the amount of fluid injected and including means providing variable orifice areas and means for supplying fluid under substantially constant pressure to said areas.

10. In apparatus for controlling the angular deflection of the thrust vector of a fluid stream discharged from the divergent section of a supersonic nozzle, the combination therewith of means arranged to inject fluid into said stream and in a direction generally transverse thereof at a substantially constant velocity regardless of the amount of fluid injected, including valve means, means arranged to control said valve means to provide a variable orifice area and means for supplying fluid under substantially constant pressure to said area.

11. In apparatus for controlling the angular deflection of the thrust vector of a fluid stream discharged from the divergent section of a supersonic nozzle, the combination therewith of means arranged to inject fluid into said stream and in a direction generally transverse thereof at a substantially constant velocity regardless of the amount of fluid injected, including valve means, fluid-operated means arranged to control said valve means to provide a variable orifice area and means for supplying fluid under substantially constant pressure to said area.

12. In apparatus for controlling the angular deflection of the thrust vector of a fluid stream discharged from the divergent section of a supersonic nozzle, the combination therewith of first means arranged to inject fluid from one side of said section into said stream and in a direction generally transverse thereof, and second means arranged to inject fluid from the other side of said section into said stream and in a direction generally transverse thereof, each of said first and second means being operative to inject fluid at a substantially constant velocity regardless of the amount of fluid injected and including valve means, means arranged to control said valve means to provide a variable orifice area and means for supplying fluid under substantially constant pressure to said area, only one of said valve means being openable at a given time.

13. In apparatus for controlling the angular deflection of the thrust vector of a fluid stream discharged from the divergent section of a supersonic nozzle, the combination therewith of means arranged to inject fluid into said stream and in a direction generally transverse thereof at a substantially constant velocity regardless of the amount of fluid injected, including valve means having a movable closure element constantly biased toward a closed condition, fluid operated means for moving said element to provide a variable orifice area, means controlling the flow of fluid with respect to said fluid operated means and means for supplying fluid under substantially constant pressure to said area.

14. In apparatus for controlling the angular deflection of the thrust vector of a fluid stream discharged from the divergent section of a supersonic nozzle, the combination comprising a first means arranged to inject fluid from one side of said section into said stream and in a direction generally transverse thereof, a second means arranged to inject fluid from the opposite side of said section into said stream and in a direction generally transverse thereof, each of said first and second means being operative to inject fluid at a substantially constant velocity regardless of the amount of fluid injected and including valve means having a movable closure element constantly biased toward a closed condition, fluid-operated means for moving said element to provide a variable orifice area, means controlling the flow of fluid with respect to both said fluid-operated means and arranged such that one urges its said element to a closed condition and the other urges its said element to an open condition and means for supplying fluid under substantially constant pressure to said areas.

15. In apparatus for controlling the angular deflection of the thrust vector of a fluid stream discharged from the divergent section of a supersonic nozzle, the combination therewith of means arranged to inject fluid into said stream and in a direction generally transverse thereof at a substantially constant velocity regardless of the amount of fluid injected, including means providing a chamber having a plurality of outlets, a valve member having a closure element for each of said outlets and movable as a unit relative to said outlets, fluid operated means for moving said valve member toward and away from said outlets to provide variable orifice areas, means controlling the flow of fluid with respect to said fluid-operated means and means for supplying said chamber with fluid under substantially constant pressure.

16. In apparatus for controlling the angular deflection of the thrust vector of a fluid stream discharged from the divergent section of a supersonic nozzle, the combination therewith of means arranged to inject fluid into said stream and in a direction generally transverse thereof at a substantially constant velocity regardless of the amount of fluid injected, including means providing a chamber having a plurality of outlets, a valve member for each of said outlets and movable relative thereto, individual means constantly biasing said valve members severally toward a closed condition and varying in preload, individual fluid-operated means for moving said valve members severally toward and away from said outlets to provide variable orifice areas, common means controlling the flow of fluid with respect to said individual fluid operated means and means for supplying said chamber with fluid under substantially constant pressure.

17. In apparatus for controlling the angular deflection of the thrust vector of a fluid stream discharged from the divergent section of a supersonic nozzle, the combination therewith of means arranged to inject fluid into said stream and in a direction generally transverse thereof at a substantially constant velocity regardless of the amount of fluid injected, including valve means having a movable sphincteral element, fluid-operated means for moving said element to provide a variable orifice area, means controlling the flow of fluid with respect to said fluid-operated means and means for supplying fluid under substantially constant pressure to said area.

18. In apparatus for controlling the angular deflection of the thrust vector of a fluid stream discharged from the divergent section of a supersonic nozzle, the combination therewith of means arranged to inject fluid into said stream and in a direction generally transverse thereof at a substantially constant velocity regardless of the amount of fluid injected, including valve means having a contractible annular sphincteral element of elastomeric material to provide a variable orifice area, fluid-operated means for effecting contraction of said element, means controlling the flow of fluid with respect to said fluid operated means and means for supplying fluid under substantially constant pressure to said area.

19. In apparatus for controlling the angular deflection of the thrust vector of a fluid stream discharged from the divergent section of a supersonic nozzle, the combination therewith of means arranged to inject fluid into said stream and in a direction generally transverse thereof at a substantially constant velocity regardless of the amount of fluid injected, including valve means having a contractible annular sphincteral element of elastomeric material to provide a variable orifice area, means providing an annular chamber surrounding said element and having a wall portion defined thereby, means controlling the flow and pressure of fluid with respect to said chamber to control the contraction of said element and means for supplying fluid under substantially constant pressure to said area.

20. In apparatus for controlling the angular deflection of the thrust vector of a fluid stream discharged from the divergent section of a supersonic nozzle, the combination therewith of means arranged to inject fluid into said stream and in a direction generally transverse thereof at a substantially constant velocity regardless of the amount of fluid injected, including valve means having a contractible sphincteral ring of elastomeric material surrounding an axially extending orifice therethrough, fluid-operated means for compressing said ring axially to control the area of said orifice, means controlling the flow of fluid with respect to said fluid operated means and means for supplying fluid under substantially constant pressure to said area.

21. In apparatus for controlling the angular deflection of the thrust vector of a fluid stream discharged from the divergent section of a supersonic nozzle, the combination therewith of means arranged to inject fluid into said stream and in a direction generally transverse thereof at a substantially constant velocity regardless of the amount of fluid injected, including control valve means, fluid-operated means arranged to regulate said control valve means to provide a variable orifice area, electrohydraulic servovalve means controlling the flow of fluid with respect to said fluid-operated means, means for supplying fluid under substantially constant pressure to said area and feedback means operatively associated with said servovalve means and responsive to fluid flow passed by said control valve means.

22. In apparatus for controlling the angular deflection of the thrust vector of a fluid stream discharged from the divergent section of a supersonic nozzle, the combination therewith of means arranged to inject fluid into said stream and in a direction generally transverse thereof at a substantially constant velocity regardless of the amount of fluid injected, including control valve means having a movable closure element, fluid-operated means arranged to regulate said control valve means to provide a variable orifice area, electrohydraulic servovalve means controlling the flow of fluid with respect to said fluid operated means, electrical feedback means operatively associated with the electrical input to said servovalve means and responsive to the position of said control valve means and means for supplying fluid under substantially constant pressure to said area.

23. In apparatus for controlling the angular deflection of the thrust vector of a fluid stream discharged from the divergent section of a supersonic nozzle, the combination therewith of means arranged to inject fluid into said stream and in a direction generally transverse thereof at a substantially constant velocity regardless of the amount of fluid injected, including means providing a chamber having an outlet surrounded by a valve seat, a valve movable relative to said seat, fluid-operated means for moving said valve toward and away from said seat to provide a variable orifice area, electrohydraulic servovalve means controlling the flow of fluid with respect to said fluid-operated means, means for supplying said chamber with fluid under substantially constant pressure, means arranged to sense flow of fluid supplied to said chamber and having a movable sensing element and feedback means operatively associated with said servovalve means and responsive to movement of said sensing element.

24. In apparatus for controlling the angular deflection of the thrust vector of a fluid stream discharged from the divergent section of a supersonic nozzle, the combination therewith of means arranged to inject fluid into said stream and in a direction generally transverse thereof at a substantially constant velocity regardless of the amount of fluid injected, including means providing a chamber having an outlet surrounded by a valve seat, a valve movable relative to said seat, fluid-operated means for moving said valve toward and away from said seat to provide a variable orifice area, electrohydraulic servovalve means controlling the flow of fluid with respect to said fluid operated means, means for supplying said chamber with fluid under substantially constant pressure, means arranged to sense flow of fluid supplied to said chamber and having a movable sensing element and electrical feedback means operatively associated with the electrical input of said servovalve means and responsive to movement of said sensing element.

25. In apparatus for controlling the angular deflection of the thrust vector of a fluid stream discharged from the divergent section of a supersonic nozzle, the combination therewith of means arranged to inject fluid into said stream and in a direction generally transverse thereof at a substantially constant velocity regardless of the amount of fluid injected, including means providing a chamber having an outlet surrounded by a valve seat, a valve movable relative to said seat, fluid-operated means for moving said valve toward and away from said seat to provide a variable orifice area, electrohydraulic servovalve means controlling the flow of fluid with respect to said fluid-operated means and having a movable pressure regulator member, means for supplying said chamber with fluid under substantially constant pressure, means arranged to sense flow of fluid supplied to said chamber and having a movable sensing element and mechanical force feedback means operatively interposed between said sensing element and pressure regulator member.

26. In a servosystem the combination comprising a source of fluid under pressure, a first valve assembly including an orifice communicating with said source, a valve member for controlling the flow through said orifice, and a differential area piston connected to said valve member having its small area end in direct communication with said source at all times; a second valve assembly including a second orifice in communication with said source in parallel with said first valve assembly, a second valve member for controlling the flow through said second orifice and a second differential area piston connected to said second valve member and having its small area end in direct communication with said source at all times, said fluid under pressure acting against said small area ends to effect closing movement of one of said valve members and opening movement of the other of said valve members; a controlled pressure chamber in communication with said source and a servovalve movable to vary the pressure level in said chamber, and means connecting the large area ends of said pistons with said chamber, the relative areas of the large area ends of said pistons with respect to each other and their corresponding small area ends being such that both said valve members are held closed when said servovalve is in its null position, and when said servo valve is moved in a direction to increase the pressure in said chamber above a threshold value, said one of the pistons is caused to withdraw its corresponding valve member from its orifice in response to the fluid pressure acting against the large area end overcoming the fluid pressure acting against the small area end of said one of the pistons, and said other piston holds its valve member against its seat in response to the fluid pressure acting against the large area end overcoming the fluid pressure acting against the small area end of said other piston, and when said servovalve is moved in a direction to decrease the pressure in said chamber below a threshold value to thereby reverse the fluid pressure differentials acting against said pistons and cause said other of the pistons to withdraw its corresponding valve member from its orifice and said one piston to hold its valve member against its seat.

27. In a servosystem the combination comprising a source of fluid under pressure, a low fluid pressure source, a first conduit connecting said source of fluid under pressure with said low fluid pressure source, a control valve in said conduit and electric motor means for controlling the position of said valve, a control chamber adjacent said valve wherein, in the absence of a signal to said electric motor means, the pressure of said fluid is controlled to a desired value, a first cylinder communicating with said control chamber, a second cylinder communicating with said control chamber, a first valve for controlling the flow of said fluid from said pressure source to a point of use, a first piston in said first cylinder connected to said first valve and responsive to the fluid pressure in said control chamber such that decreases in the controlled pressure in said cylinder below a first threshold value lower than said desired value causes said first valve to be opened in response to said decrease in said controlled pressure acting against said first piston and pressure above said first threshold value causes said valve to be held closed in response to said increase in said controlled fluid pressure acting against said first piston, a second valve in parallel with said first valve for controlling the flow of said fluid, a second piston in said second cylinder connected to said second valve and responsive to the fluid pressure in said control chamber such that increases in the controlled pressure in said second cylinder above a second threshold value higher than said desired value causes said second valve to be opened in response to said increase in said controlled pressure acting against said second piston, and pressures below said second threshold value cause said valve to be held closed in response to a decrease in said pressure below said second threshold value acting against said second piston.

28. A servosystem as set forth in claim 27 wherein electrical circuit means are provided to supply control signals to said electric motor means and electrical feedback means are operatively connected to said pistons to supply position feedback signals to said circuit means.

29. In a servosystem the combination comprising a source of fluid under pressure, a first valve assembly and a second valve assembly both of which are in parallel communication with said source and each of which includes a valve member for controlling the flow through its corresponding orifice, and a differential area piston connected to each of said valve members, a controlled pressure chamber in communication with said source and a servo valve movable to vary the pressure level in said chamber, means connecting said controlled pressure chamber and said source to opposing sides of said pistons such that said pistons are responsive to the pressure differential between the chamber and the source, the relative areas of the ends of said pistons being such that both said valve members are held closed when said servovalve is in its null position, and when said servovalve is moved in a direction to increase the pressure in said chamber above a threshold value, one of said pistons is caused to withdraw its corresponding valve member from its orifice in response to the increase in said pressure differential and the other piston holds its valve member against its seat in response to the increase in said pressure differential, and when said servovalve is moved in a direction to decrease the pressure in said chamber below a second, lower threshold value, the other of said pistons is caused to withdraw its corresponding valve member from its orifice in response to the decrease in said pressure differential and said one piston holds its valve member against its seat in response to the decrease in said pressure differential.

30. For use with a thrust vector control including a rocket nozzle, first and second injection orifices oppositely disposed in the sidewall of said rocket nozzle and a source of fluid under pressure, said first and second injection orifices arranged to inject said pressurized fluid into said nozzle transversely to the longitudinal axis of said nozzle to thereby effect a corresponding variation in the nozzle thrust vector, the combination of a first injector unit connected to said source including a valve for controlling the flow through said first orifice and a differential area piston connected to said valve with the small area end of said piston in communication with said source, a second injector unit connected to said source including a second valve for controlling the flow through said second orifice and a second differential area piston connected to said second orifice with the small end of said piston in communication with said source, a controlled pressure chamber and a torque motor including a pair of orifices and a flapper valve movable therebetween to vary the pressure in said chamber, and means connecting the large area ends of said pistons with said chamber, the relative areas of the large area ends of said pistons with respect to each other and their corresponding small area ends being such that both said valve members are held closed when said flapper valve member is in its null position, and when said flapper valve is moved closer to said one orifice and the control pressure level is reduced below a first threshold value, one of said valves is caused to open and when said flapper valve is moved closer to said other orifice, and the control pressure is increased above a second, higher threshold value, said one valve is closed and the other of said valves is caused to be opened.

31. For use with a thrust vector control including a rocket nozzle, first and second injection orifices oppositely disposed in the sidewall of said rocket nozzle and a source of fluid under pressure, said first and second injection orifices arranged to inject said pressurized fluid into said nozzle transversely to the longitudinal axis of said nozzle to thereby effect a corresponding variation in the nozzle thrust vector, the combination of a first injector unit connected to said source including a valve for controlling the flow through said first orifice and a differential area piston connected to said valve with the small area end of said piston in communication with said source, a second injector unit connected to said source including a second valve for controlling the flow through said second orifice and a second differential area piston connected to said second valve with the small area end of said piston in communication with said source, a control pressure chamber and a servo valve movable to vary the pressure in said chamber, and means connecting the large area ends of said pistons with said chamber, the relative areas of the large area ends of said pistons with respect to each other and their corresponding small area ends being such that both said valve members are held closed when said servovalve is in its null position, and when said servovalve is moved to increase the control pressure above the null pressure level one of said valves is caused to open and when said servovalve is moved to decrease the control pressure level below the null pressure level said one valve is opened and the other of said valves is caused to be closed.

* * * * *

UNITED STATES PATENT OFFICE
CERTIFICATE OF CORRECTION

Patent No. 3646762            Dated March 7, 1972

Inventor(s) George W. Hawk, et al

It is certified that error appears in the above-identified patent and that said Letters Patent are hereby corrected as shown below:

Column 8, line 53, "heat" should read --head--.

Column 9, line 42-43, after "is" delete --intermediate the lobes 198 and 199. The pressure port 202 is --.

Column 12, line 29, "to" should read --so--.

Column 16, line 29, after "402" delete --are--.

Column 16, line 30, "am" should read --an--.

Signed and sealed this 19th day of September 1972.

(SEAL)
Attest:

EDWARD M. FLETCHER, JR.
Attesting Officer

ROBERT GOTTSCHALK
Commissioner of Patents